(12) United States Patent
Zhang et al.

(10) Patent No.: US 12,404,408 B2
(45) Date of Patent: Sep. 2, 2025

(54) PROCESSES FOR FUNCTIONALIZATION AND POLYMERIZATION OF POLYAROMATIC FEEDSTOCK

(71) Applicant: ExxonMobil Technology and Engineering Company, Annandale, NJ (US)

(72) Inventors: Yunlong Zhang, Annandale, NJ (US); Jordan N. Metz, Doylestown, PA (US); Huaxing Zhou, Warwick, PA (US); August W. Bosse, Pennington, NJ (US); Suzzy C. Ho, Princeton, NJ (US); Timothy D. Shaffer, Plainfield, NJ (US); Ozcan Altintas, Franklin Park, NJ (US)

(73) Assignee: Exxon Mobil Technology and Engineering Company, Spring, TX (US)

( * ) Notice: Subject to any disclaimer, the term of this patent is extended or adjusted under 35 U.S.C. 154(b) by 722 days.

(21) Appl. No.: 17/632,702

(22) PCT Filed: Aug. 10, 2020

(86) PCT No.: PCT/US2020/045653
§ 371 (c)(1),
(2) Date: Feb. 3, 2022

(87) PCT Pub. No.: WO2021/030287
PCT Pub. Date: Feb. 18, 2021

(65) Prior Publication Data
US 2022/0282091 A1 Sep. 8, 2022

Related U.S. Application Data

(60) Provisional application No. 62/886,252, filed on Aug. 13, 2019.

(51) Int. Cl.
*C08L 95/00* (2006.01)
*C08L 63/00* (2006.01)

(52) U.S. Cl.
CPC ............... *C08L 95/00* (2013.01); *C08L 63/00* (2013.01); *C08L 2205/02* (2013.01)

(58) Field of Classification Search
CPC .................................................. C08L 95/00
See application file for complete search history.

(56) References Cited

U.S. PATENT DOCUMENTS

| | | | | |
|---|---|---|---|---|
| 3,230,267 A | * | 1/1966 | Fields | C10M 1/08 568/655 |
| 3,369,012 A | | 2/1968 | Lundberg | |
| 3,810,857 A | | 5/1974 | Garrigues et al. | |
| 3,933,768 A | | 1/1976 | Yukuta et al. | |
| 4,234,512 A | * | 11/1980 | Van Berkel | C07C 47/37 568/591 |
| 4,337,193 A | | 6/1982 | Szita | |
| 4,405,789 A | * | 9/1983 | Champseix | C07D 401/06 546/176 |
| 4,518,483 A | * | 5/1985 | Dickakian | C10C 3/002 208/22 |
| 6,087,420 A | | 7/2000 | Planche et al. | |
| 2015/0322198 A1 | | 11/2015 | Hayer et al. | |
| 2016/0090441 A1 | | 3/2016 | Park et al. | |
| 2016/0130431 A1 | | 5/2016 | Nagano et al. | |
| 2019/0077668 A1 | | 3/2019 | Zhamu et al. | |
| 2020/0087552 A1 | | 3/2020 | Gerber et al. | |

FOREIGN PATENT DOCUMENTS

| | | |
|---|---|---|
| CN | 101450986 A | 6/2009 |
| GB | 1327417 | 8/1973 |
| GB | 1458782 A | 12/1976 |
| JP | H11131076 A | 5/1999 |
| WO | 91/09907 A1 | 7/1991 |
| WO | 2019/199431 A1 | 10/2019 |

OTHER PUBLICATIONS

The International Search Report and Written Opinion for PCT/US2020/045653 filed Aug. 10, 2020.
The International Search Report and Written Opinion for PCT/US2020/045659 filed Aug. 10, 2020.
Navarro et al., "Bitumen modification with a low-molecular-weight reactive isocyanate-terminated polymer." Fuel 86 (2007) 2291-2299.
Fedorynski, "Syntheses of gem-Dihalocyclopropanes and Their Use in Organic Synthesis", Chem. Rev. 2003, 103, 1099-1132.

(Continued)

*Primary Examiner* — Vickey Nerangis
(74) *Attorney, Agent, or Firm* — C. Tumey Law Group PLLC

(57) ABSTRACT

Processes for chemically treating polyaromatic feedstock to form aromatic-containing oligomers or polymers are provided. The processes are characterized by treatment of a plurality of different polyaromatic hydrocarbon molecules and/or polyheterocyclic molecules present in polyaromatic feedstock with a first reagent so as to functionalize the molecules. Further treatment in a second step affords oligomeric or polymeric products which may be crosslinked. The products may be thermoplastic or thermoset materials and may find use in, for example, infrastructure applications, composites, fillers, fire retardants and 3-D printing materials.

8 Claims, 12 Drawing Sheets

(56) References Cited

OTHER PUBLICATIONS

Shuler et al., "Heavy Oil Based Mixtures of Different Origins and Treatments Studied by Atomic Force Microscopy", Energy Fuels 2017, 31, 6856-6861.

Mullins et al., "Molecular structure and aggregation of asphaltenes and petroleomics", SPE Int (2005), 1-10.

Chinese Office Action for CN Patent Application No. 202080056728.X dated May 23, 2024. English Translation with Original Untranslated Version, PDF file. 16 pages.

* cited by examiner

PROCESSES FOR FUNCTIONALIZATION AND POLYMERIZATION OF POLYAROMATIC FEEDSTOCK

CROSS-REFERENCE TO RELATED APPLICATIONS

This application is a national stage application under 35 USC 371 of International Application No. PCT/US2020/045653, filed on Aug. 10, 2020, which claimed the benefit of U.S. Provisional Patent Application No. 62/886,252 filed Aug. 13, 2019.

FIELD OF THE INVENTION

This disclosure relates to processes for chemically treating polyaromatic feedstock to form aromatic-containing oligomers or polymers. The processes involve functionalizing polyaromatic hydrocarbon molecules and/or polyheterocyclic molecules present in petroleum or petrochemical streams and further treating the functionalized molecules so as to effect oligomerization or polymerization. The products may be thermoplastic or thermoset materials and may find use in, for example, infrastructure applications, composites, fillers, fire retardants and 3-D printing materials.

BACKGROUND OF THE INVENTION

Polyaromatic hydrocarbon molecules and/or polyheterocyclic molecules may be found in native crude oils, petroleum refinery streams and various petrochemical streams. However, the precise chemical structures of most molecules in these streams are unknown due to the highly heterogeneous nature of petroleum which contains hundreds of thousands of species as detected by ultrahigh resolution mass spectroscopy.

Most of these streams may also contain metals such as vanadium, nickel, iron, calcium, sodium and aluminum as well as heteroatoms such as nitrogen, sulfur, and oxygen. The heteroatoms may substitute for carbon atoms in various molecules present in the streams.

The constituents of, for example, asphaltene, have been widely reported as having one or more fused polyaromatic ring systems and containing one or more heteroatoms such as sulfur, oxygen, nitrogen, and the like. The heteroatoms may be part of the aromatic ring system or part of other carbocyclic rings, linking groups, or functional groups.

In addition to the aromatic regions of the asphaltenes, heteroatoms provide the asphaltenes with polar regions, and the terminal alkyl chains provide hydrophobic regions. Asphaltenes may also contain polar functional groups such as carbonyl, carboxylic acid, pyrrole, pyridine, phenol, thiol and thiophene, and various multiple fused ring heterocycles.

In view of the many constituents of petroleum streams, characterization has proved challenging. The molecular structure of petroleum is so complex that it is nearly impossible to enumerate each of the components. However, very recent studies of asphaltenes and other polyaromatic feedstock mixtures using atomic force microscopy (Schuler B. et al, Heavy Oil Based Mixtures of Different Origins and Treatments Studied by Atomic Force Microscopy, Energy Fuels, 2017, 31, 6856-6861) has provided direct information on the precise molecular structure of individual constituents.

Historically, asphaltenes were believed to contain very high molecular weight materials (>10,000 Daltons) however recent research has uncovered that most molecules in asphaltene are of relatively low molecular weight (average of 750 Daltons and a majority in the range of 200-2000 Daltons). See, for example, Mullins O., Molecular Structure and Aggregation of Asphaltenes and Petroleomics, Society of Petroleum Engineers, October 2005 and Mullins, O. C., Sheu, E. Y., Hammami, A., Marshall, A. G., Asphaltenes, Heavy Oils, and Petroleomics; Springer, 2007.

Knowledge of the structures of even some of the constituents of different petroleum streams may enable the development of new chemistries and processes, potentially affording routes to valuable new materials.

It would be desirable to identify processes of upgrading these highly complex streams to higher value materials, such methods providing an alternative to conventional hydroconversion or thermal coking processes. Such higher value materials may find use in, for example, infrastructure applications, composites, fillers, fire retardants and 3-D printing materials. Such high value products for direct material applications would also possess additional advantages compared to alternative technologies in which polyaromatic feedstock is processed into fuel, such as reducing $CO_2$ emissions. Further, such products may assist in meeting future demands for materials due to increasing world population and consumer sophistication.

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

SUMMARY

The present disclosure is directed to new processes for preparing oligomers or polymers from polyaromatic feedstocks. The polyaromatic feedstocks comprise mixtures of different polyaromatic hydrocarbon molecules and/or mixtures of different polyheterocyclic molecules. The oligomers or polymers may be formed by functionalizing the polyaromatic hydrocarbon molecules and/or polyheterocyclic molecules in a first step and subsequently oligomerizing or polymerizing the so-formed functionalized molecules in a second step. In some embodiments the oligomers and/or polymers are crosslinked.

In one aspect the present disclosure provides a process for oligomerizing or polymerizing polyaromatic feedstock, said process comprising:

(a) contacting polyaromatic feedstock with one or more first reagents under conditions effective to introduce one or more functional groups into a plurality of different polyaromatic hydrocarbon molecules and/or different polyheterocyclic molecules present in the polyaromatic feedstock; and (b) treating the functionalized polyaromatic feedstock under conditions effective to oligomerize or polymerize at least some of the plurality of functionalized molecules; wherein the oligomerization or polymerization is effected via the functional groups introduced in (a).

In some embodiments step (a) is represented by equation (1):

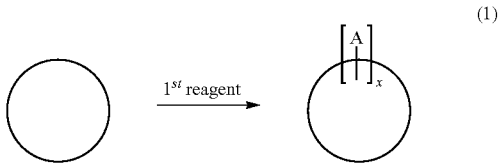

(1)

wherein the reactant circle represents, independently, one of a plurality of polyaromatic hydrocarbon molecules and/or polyheterocyclic molecules present in the polyaromatic feedstock, A represents a functional group attached to a ring carbon atom, a ring heteroatom, an optional ring substituent and combinations thereof, x represents the number of functional groups A and is an integer greater than or equal to 1, with the proviso that in at least some of the plurality of functionalized polyaromatic hydrocarbon molecules and/or polyheterocyclic molecules x is an integer greater than or equal to 2.

In some embodiments the functionalization in equation (1) occurs at a carbon atom of an aromatic or heteroaromatic ring. In preferred embodiments said carbon atom is a carbon atom of a carbon-carbon double bond having olefinic character.

In some embodiments one or more rings of the polyaromatic hydrocarbon molecule and/or polyheterocyclic molecule may be further substituted.

FIG. 1 illustrates a number of polyaromatic hydrocarbon molecules and polyheterocyclic molecules present in polyaromatic feedstock. The carbon-carbon double bonds highlighted with arrows have olefinic character. Such reaction sites have been confirmed with quantum calculations on bond order analysis. These sites may be the so-called 'K region'.

In some embodiments of equation (1), A is a functional group selected from the group consisting of halide, aldehyde, ketone, carboxylic acid, ester, thiol, amine, amide, hydroxyl, isocyanide, azide, olefin, and mixtures thereof.

In other embodiments step (a) is represented by equation (2):

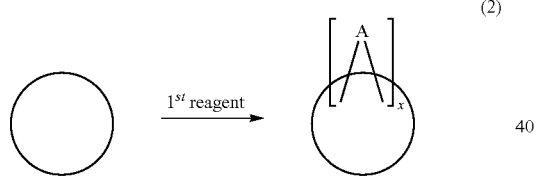

(2)

wherein the reactant circle represents, independently, one of a plurality of polyaromatic hydrocarbon molecules and/or polyheterocyclic molecules present in the polyaromatic feedstock, A represents a functional group which bridges two ring carbon atoms, two ring heteroatoms or a ring carbon atom and a ring heteroatom, x represents the number of functional groups A and is an integer greater than or equal to 1, with the proviso that in at least some of the plurality of functionalized polyaromatic hydrocarbon molecules and/or polyheterocyclic molecules x is an integer greater than or equal to 2.

In some embodiments one or more rings of the polyaromatic hydrocarbon molecule and/or polyheterocyclic molecule may be further substituted.

In some embodiments the functionalization in equation (2) occurs across a carbon-carbon bond having olefinic character so as to form a fused ring.

In some embodiments of equation (2), A is a functional group selected from the group consisting of oxygen, substituted carbon, for example $CR_2$ (R=linear or branched alkyl), $CX_2$ (X=halide), a double bond, an ester and an amide.

In some embodiments the treating in step (b) is selected from the group consisting of thermal, photolytic, one or more second reagents, and combinations thereof.

In some embodiments step (b) may be effected by thermal treatment of the plurality of functionalized molecules, in the presence or absence of one or more second reagents.

In other embodiments step (b) may be effected by photolytic treatment of the plurality of functionalized molecules, in the presence or absence of one or more second reagents.

The treating in step (b) results in the formation of oligomers and/or polymers comprising polyaromatic hydrocarbon moieties and/or polyheterocyclic moieties, wherein said moieties are connected via aryl-aryl bonds, aryl-heteroaryl bonds, heteroaryl-heteroaryl bonds, linking groups which may comprise one or more heteroatoms, and combinations thereof.

In preferred embodiments the one or more second reagents is different to the one or more first reagents.

In some embodiments the one or more second reagents effects oligomerization and/or polymerization of the plurality of functionalized molecules, but does not form part of the resulting oligomer or polymer.

Equation (3) illustrates a general scheme in accordance with one embodiment of the present disclosure wherein the plurality of functionalized molecules formed in step (a) or equation (1) are further treated, as in step (b), to effect oligomerization and/or polymerization

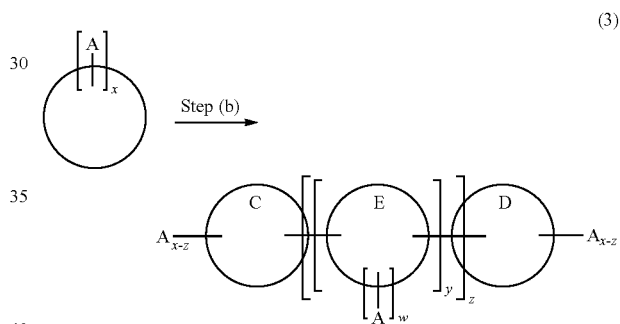

(3)

wherein the reactant represents a plurality of functionalized polyaromatic hydrocarbon molecules and/or functionalized polyheterocyclic molecules, the circles C, D and E represent, independently, polyaromatic hydrocarbon moieties or polyheterocyclic moieties, A represents a functional group attached to a ring carbon atom, a ring heteroatom, an optional ring substituent and combinations thereof, the lines joining the circles C and D to E in the oligomerized and/or polymerized product represent a carbon-carbon bond or carbon-heteroatom bond, x and w represent the number of functional groups A, wherein x is an integer greater than or equal to 2 and w is a whole number greater than or equal to zero, y represents the number of moieties $E-A_w$ which link moieties C and D, z represents the number of links between moieties C and D, and y is a whole number greater than or equal to zero.

Preferably, y is an integer greater than 1, more preferably greater than 5, or greater than 10, or greater than 20, or greater than 50. Preferably x is from 2 to 8. Preferably z is from 1 to 4.

In some embodiments at least some of the plurality of functionalized polyaromatic hydrocarbon molecules and/or functionalized polyheterocyclic molecules in the reactant of equation (3) may have x=1.

It will be appreciated that, in some embodiments, the plurality of functionalized polyaromatic hydrocarbon molecules and/or polyheterocyclic molecules in which x=1 may not directly participate in the formation of oligomeric or polymeric chains but may become part of the products, for example as in an end-cap of a chain.

In other embodiments the plurality of functionalized molecules in which x=1 may oligomerize and or polymerize through, for example, forming two or more reactive sites when treated in step (b). Under such circumstances, molecules in which x=1 may participate in chain formation.

In other embodiments moieties E in equation (3) may further comprise, in addition to the illustrated links to moieties C and D, one or more crosslinks to polyaromatic hydrocarbon moieties and/or polyheterocyclic moieties F as illustrated in equation (4), wherein w is a whole number greater than or equal to 0, and p is an integer greater than or equal to 1.

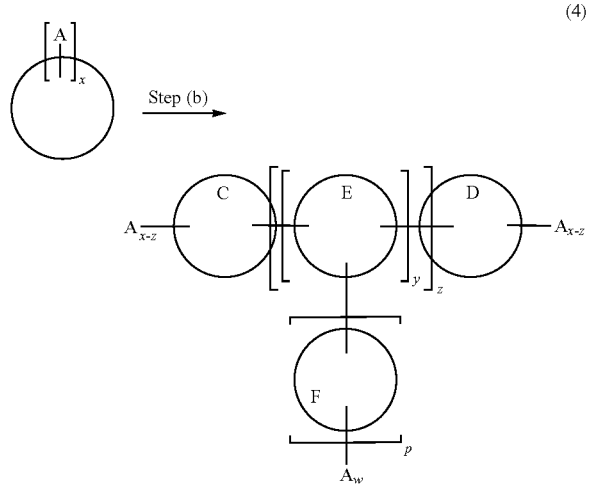

(4)

As will be appreciated, further branching of the product of equation (4) may occur as a result of step (b), affording a crosslinked network of polyaromatic hydrocarbon moieties and/or polyheterocyclic moieties.

0001. Equation (5) illustrates a general scheme, according to another embodiment of the present disclosure, wherein the functionalized polyaromatic compounds and/or polyheterocyclic compounds formed in step (a) or equation (2) are oligomerized and/or polymerized, as in step (b), to produce higher molecular weight oligomers and/or polymers

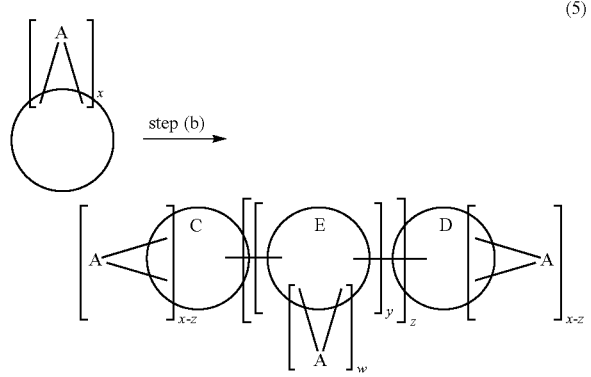

(5)

wherein the reactant represents a plurality of functionalized polyaromatic hydrocarbon molecules and/or functionalized polyheterocyclic molecules, the circles C, D and E represent, independently, polyaromatic hydrocarbon moieties or polyheterocyclic moieties, A represents a functional group which bridges two ring carbon atoms, two ring heteroatoms, or a ring carbon atom and a ring heteroatom, the lines joining the circles C and D to E in the oligomerized and/or polymerized product represent a carbon-carbon bond or a carbon-heteroatom bond, x and w represent the number of functional groups, wherein x is an integer greater than or equal to 2 and w is a whole number greater than or equal to zero, y represents the number of moieties $E(=A)_w$ which link moieties C and D, and z represents the number of links between moieties C and D, y is a whole number greater than or equal to zero and z is an integer greater than or equal to 1.

Preferably, y is an integer greater than or equal to 1, more preferably greater than or equal to 5, or greater than or equal to 10, or greater than or equal to 20, or greater than or equal to 50. Preferably x is from 2 to 8. Preferably z is from 1 to 4.

In some embodiments at least some of the plurality of functionalized polyaromatic hydrocarbon molecules and/or polyheterocyclic molecules in the reactant of equation (5) may have x=1.

It will be appreciated that, in some embodiments, functionalized polyaromatic hydrocarbon molecules and/or polyheterocyclic molecules in which x=1 may not directly participate in the formation of oligomeric or polymeric chains but may become part of the products, for example as in an end-cap of a chain.

In other embodiments the functionalized molecules in which x=1 may oligomerize and/or polymerize through, for example, forming two or more reactive sites when treated as in equation (5). Under such circumstances, molecules in which x=1 may participate in chain formation.

In other embodiments moieties E in equation (5) may further comprise, in addition to the illustrated links to moieties C and D, one or more crosslinks to polyaromatic hydrocarbon or polyheterocyclic moieties F as illustrated in equation (6), wherein w is a whole number greater than or equal to 0, and p is an integer greater than or equal to 1.

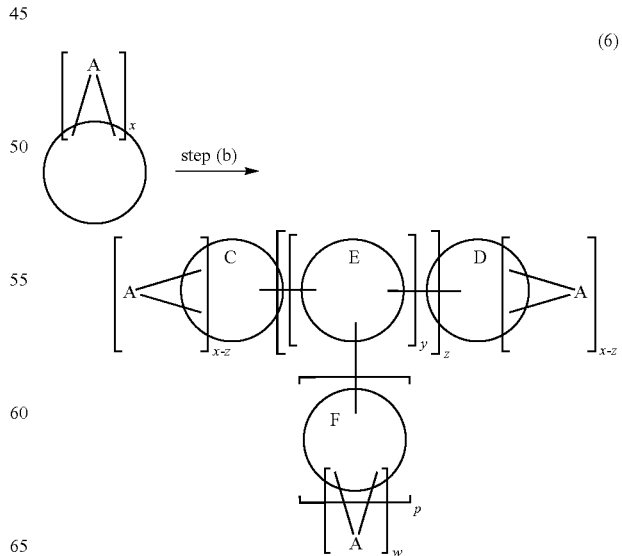

(6)

As will be appreciated, further branching of the product of equation (6) may occur, affording a crosslinked network comprising polyaromatic hydrocarbon moieties and/or polyheterocyclic moieties.

In other embodiments, the one or more second reagents, when present, forms at least part of a link between polyaromatic hydrocarbon moieties and/or polyheterocyclic moieties. The one or more second reagents may be a polyfunctional reagent. The second reagent may comprise at least two functional groups capable of reacting with the functional groups A to link two or more polyaromatic hydrocarbon moieties and/or polyheterocyclic moieties. In some embodiments the at least two functional groups comprise active hydrogen moieties.

Equation (7) illustrates a general scheme in accordance with another embodiment of the present disclosure wherein the plurality of functionalized molecules formed in step (a) or equation (1) are further treated, as in step (b), with a second reagent to effect oligomerization and/or polymerization.

In other embodiments moieties E in equation (7) may further comprise, in addition to the illustrated chains to molecules C and D, one or more crosslinks to polyaromatic hydrocarbon moieties or polyheterocyclic moieties F as illustrated in equation (8), wherein w is a whole number greater than or equal to zero, and p is an integer greater than or equal to 1.

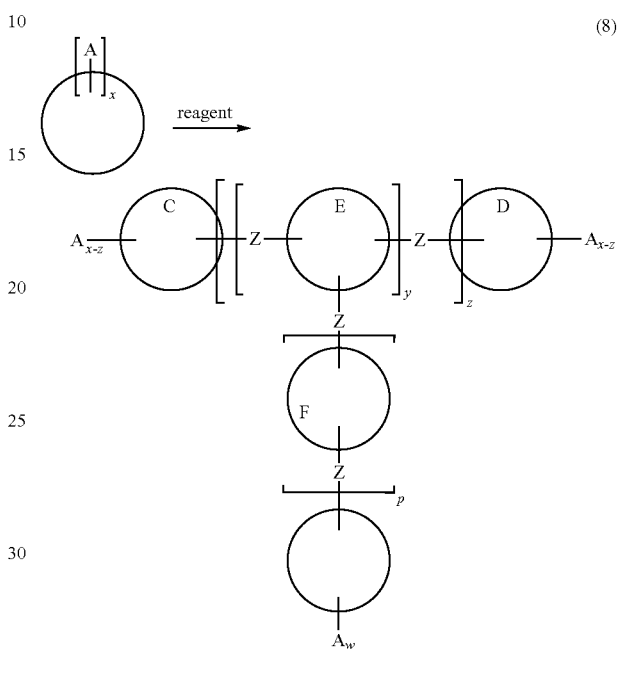

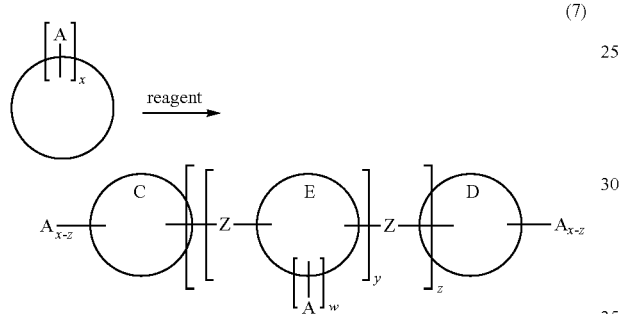

wherein the reactant represents a plurality of functionalized polyaromatic hydrocarbon molecules and/or functionalized polyheterocyclic molecules, the circles C, D and E represent, independently, polyaromatic hydrocarbon moieties or polyheterocyclic moieties, A represents a functional group attached to a ring carbon atom, a ring heteroatom, an optional ring substituent and combinations thereof, Z is a linking moiety at least partially derived from the reagent, x is an integer greater than or equal to 2, y represents the number of moieties $Z-E-[A]_w$ which link moieties C and D, and z represents the number of links between moieties C and D, y and w are a whole numbers greater than or equal to zero, and z is an integer greater than or equal to 1.

Preferably, y is an integer greater than 2, more preferably greater than 5, or greater than 10, or greater than 20, or greater than 50.

In some embodiments at least some of the plurality of functionalized polyaromatic hydrocarbon molecules and/or functionalized polyheterocyclic molecules in the reactant of equation (7) may have x=1.

It will be appreciated that, in some embodiments, the plurality of functionalized polyaromatic hydrocarbon molecules and/or polyheterocyclic molecules in which x=1 may not directly participate in the formation of oligomeric or polymeric chains but may become part of the product, for example as in an end-cap of a chain.

In other embodiments the plurality of functionalized molecules in which x=1 may link through, for example, forming two or more reactive sites when treated in step (b). Under such circumstances, molecules in which x=1 may participate in chain formation.

As will be appreciated, further branching of the product of equation (8) may occur as a result of step (b), affording an interconnected crosslinked network of polyaromatic hydrocarbon moieties and/or polyheterocyclic moieties.

Equation (9) illustrates a general scheme in accordance with another embodiment of the present disclosure wherein the plurality of functionalized molecules formed in step (a) or equation (2) are further treated, as in step (b), with a second reagent, to effect oligomerization and/or polymerization

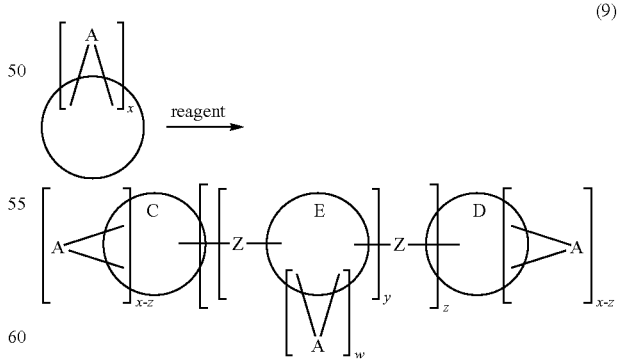

wherein the reactant represents a plurality of functionalized polyaromatic hydrocarbon molecules and/or functionalized polyheterocyclic molecules, the circles C, D and E represent, independently, polyaromatic hydrocarbon moieties or polyheterocyclic moieties, A represents a functional group which bridges two ring carbon atoms, two ring heteroatoms, or a ring carbon atom and a ring heteroatom, Z is a linking moiety at least partially derived from the reagent, x is an integer greater than or equal to 2, y represents the number of moieties $Z-E(=A)_w$ which link moieties C and D, and z represents the number of links between moieties C and D, y and w are a whole numbers greater than or equal to zero, and z is an integer greater than or equal to 1.

Preferably, y is an integer greater than or equal to 2, more preferably greater than or equal to 5, or greater than or equal to 10, or greater than or equal to 20, or greater than or equal to 50.

In some embodiments at least some of the plurality of functionalized hydrocarbon molecules in the reactant of equation (9) may have $x=1$.

It will be appreciated that, in some embodiments, the plurality of functionalized polyaromatic hydrocarbon molecules and/or polyheterocyclic molecules in which $x=1$ may not directly participate in the formation of oligomeric or polymeric chains but may become part of the product, for example as in an end-cap of a chain.

In other embodiments the plurality of functionalized molecules in which $x=1$ may link through, for example, forming two or more reactive sites when treated in step (b). Under such circumstances, molecules in which $x=1$ may participate in chain formation.

In other embodiments moieties E in equation (9) may further comprise, in addition to the illustrated links to moieties C and D, one or more crosslinks to polyaromatic hydrocarbon or polyheterocyclic moieties F as illustrated in equation (10), wherein w is a whole number greater than or equal to zero, and p is a whole number greater than or equal to zero.

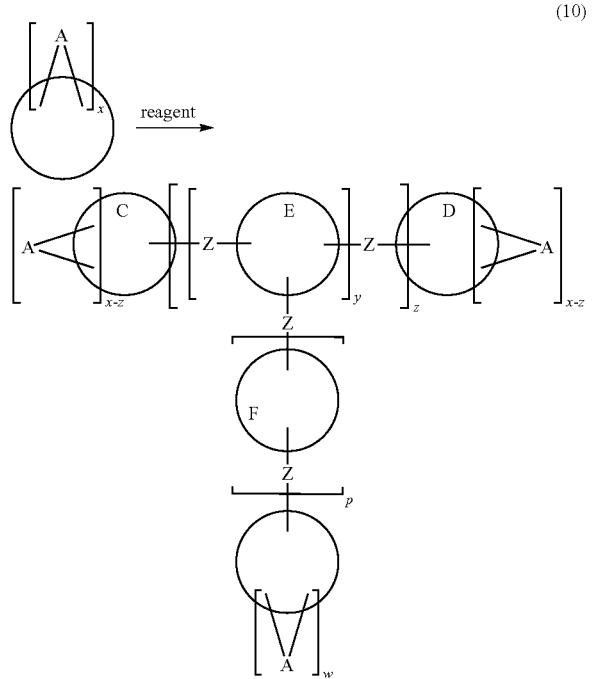

(10)

As will be appreciated, further branching of the product of equation (10) may occur as a result of treatment with a reagent, affording a crosslinked network comprising polyaromatic hydrocarbon moieties and/or polyheterocyclic moieties.

In any one or more of the herein disclosed embodiments the oligomerization and/or polymerization occurs between functionalized polyaromatic hydrocarbon or functionalized polyheterocyclic molecules which have the same structure.

In preferred embodiments the oligomerization and/or polymerization occurs between functionalized polyaromatic hydrocarbon or functionalized polyheterocyclic molecules which have different structures.

In some embodiments more than one link may form between two molecules.

In preferred embodiments the plurality of different polyaromatic hydrocarbon molecules and/or different polyheterocyclic molecules comprises 2 or more, or 5 or more, or 10 or more, or 20 or more, or 50 or more, or 100 or more, or 1,000 or more, or 5,000 or more, or 10,000 or more, or 100,000 or more, different molecules. In particularly preferred embodiments the plurality of different polyaromatic hydrocarbon molecules and/or different polyheterocyclic molecules comprises 100 or more, or 1,000 or more different molecules.

In some embodiments the average molecular weight of the plurality of different polyaromatic hydrocarbon molecules and/or different polyheterocyclic molecules is between about 150 and about 1200 Daltons, or between about 300 and about 1200 Daltons, or between about 400 and about 1200 Daltons, or between about 600 and about 900 Daltons, or between about 650 and about 850 Daltons.

In some embodiments the full width half maximum molecular weight of the plurality of different polyaromatic hydrocarbon molecules and/or different polyheterocyclic molecules is between about 500 and about 1000 Daltons.

In some embodiments the polyaromatic hydrocarbon molecules and/or polyheterocyclic molecules are constituents of one or more of residues of petrochemical refining or extraction, such as vacuum residue, fluidic catalytic cracking ('FCC') bottoms (slurry oil, main column bottoms (MCB)), steam cracker tar, asphaltenes, C3-C7 rock, bitumen, K-pot bottoms, lube extracts, various streams from refinery processes and other synthetic aromatic hydrocarbons.

In some embodiments individual chains in the oligomers and/or polymers comprise 2 or more, or 5 or more, or 10 or more, or 20 or more, or 50 or more, or 100 or more, or 1,000 or more, or 5,000 or more, or 10,000 or more, or 100,000 or more, polyaromatic hydrocarbon moieties and/or polyheterocyclic moieties. Preferably, individual chains in the oligomers and/or polymers comprise 20 or more, or 50 or more, or 100 or more, or 1,000 or more, or 5,000 or more, or 10,000 or more, or 100,000 or more, polyaromatic hydrocarbon moieties and/or polyheterocyclic moieties. More preferably, individual chains in the oligomers and/or polymers comprise 100 or more polyaromatic hydrocarbon moieties and/or polyheterocyclic moieties.

In some embodiments the plurality of different polyaromatic hydrocarbon molecules and/or different polyheterocyclic molecules comprise one or more transition metals.

In some embodiments the plurality of different polyaromatic hydrocarbon molecules and/or different polyheterocyclic molecules comprise one or more atoms selected from the group consisting of nitrogen, sulfur and non-epoxide oxygen.

In some embodiments the plurality of different polyaromatic hydrocarbon molecules and/or different polyheterocyclic molecules comprise one or more functional groups comprising one or more of oxygen, nitrogen or sulfur atoms, wherein said functional group is present as a substituent or within a substituent on an aromatic or aliphatic carbon atom.

In some embodiments the weight average molecular weight of the oligomers and/or polymers is up to about 100,000 Daltons, or up to about 200,000 Daltons, or up to about 300,000 Daltons, or up to about 500,000 Daltons, or up to about 700,000 Daltons, or up to about 1,000,000 Daltons.

In some embodiments the first reagent is halogen and the second reagent is a reagent capable of coupling halogenated aryl or halogenated heterocyclic moieties.

The second reagent may be a metal or metal complex, for example copper metal. Alternatively, the second reagent may be an acid.

In other embodiments the first reagent is an epoxidation reagent and the second reagent is a reagent comprising at least two functional groups. Preferably, the functional groups comprise active hydrogen moieties.

In some preferred embodiments the epoxidation reagent is dimethyldioxirane

In other embodiments the reagent comprising at least two functional groups comprising active hydrogen moieties includes amines, acids, acid anhydrides, phenols, alcohols and thiols.

In some preferred embodiments the reagent comprising at least two functional groups comprising active hydrogen moieties is a polyamine, for example diamines, triamines, tetraamines and mixtures thereof.

In other embodiments the first reagent is a carbene and the second reagent is a reagent comprising at least two functional groups. Preferably, the functional groups comprise active hydrogen moieties.

When the first reagent is a carbene the functionalized molecules comprise cyclopropane rings. Such functionalized molecules may be thermally oligomerized and/or polymerized in the presence or absence of a second reagent In some preferred embodiments the carbene is a dihalocarbene.

In other embodiments the functionalization reaction may occur at the alpha position of alkyl substituents directly attached to the aromatic rings through functionalization with heteroatoms, such as halogen, O, and N atoms, which then further react to afford oligomeric and/or polymeric products. Equation (11) illustrates such a reaction, wherein X=halide, O or N containing substituent.

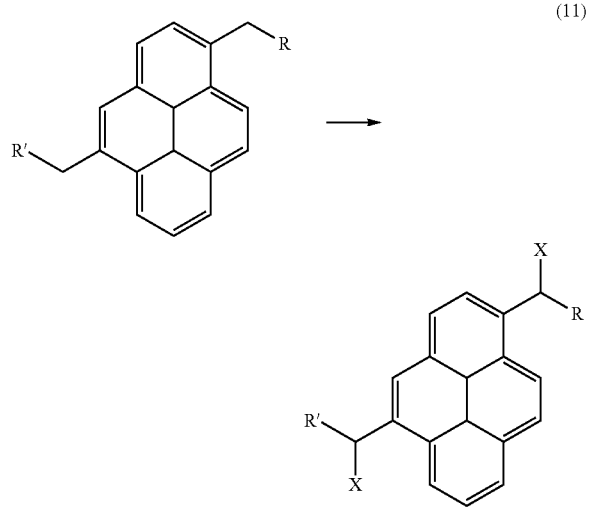

(11)

A particular advantage of the present processes is that an extremely diverse range of polyaromatic hydrocarbon compounds and/or polyheterocyclic compounds present in polyaromatic feedstock may be functionalized in a first step to introduce a common reactive functional group, for example halogen, which effectively 'homogenizes' the polyaromatic feedstock, activating it for the second oligomerization and/or polymerization step.

In some embodiments the reagent in step (b) may be a commercially available reagent.

In some embodiments step (a) and step (b) may be performed sequentially in a single reactor. In other embodiments step (a) and step (b) may be performed concurrently, that is to say that functionalized molecules formed in step (a) may be oligomerized and/or polymerized in step (b) at the same time as further functionalized molecules are being formed.

In other embodiments, the functionalized product from step (a) may be isolated and subsequently oligomerized and/or polymerized in step (b) as a separate step.

In another aspect the present disclosure provides a process for preparing an oligomeric or polymeric material from a polyaromatic feedstock, said process comprising:

(a) contacting a first polyaromatic feedstock with one or more first reagents under conditions effective to introduce one or more functional groups into a plurality of different polyaromatic hydrocarbon molecules and/or different polyheterocyclic molecules present in the first polyaromatic feedstock; and (b) contacting a second polyaromatic feedstock with one or more first reagents under conditions effective to introduce one or more functional groups into a plurality of different polyaromatic hydrocarbon molecules and/or different polyheterocyclic molecules present in the second polyaromatic feedstock; and (c) combining the first and second functionalized polyaromatic feedstocks under conditions effective to oligomerize and/or polymerize at least some of the plurality of functionalized molecules to form an oligomer and/or polymer; wherein the oligomerization and/or polymerization is effected via the functional groups introduced in (a) and/or (b).

In some embodiments the first and second polyaromatic feedstocks may be the same. In other embodiments the first and second polyaromatic feedstocks may be different.

In preferred embodiments the first reagent of step (a) and the first reagent of step (b) may be different.

In any of the herein disclosed embodiments the H/C ratio of the polyaromatic feedstock is less than 1.2.

In any of the herein disclosed embodiments the polyaromatic feedstock has an aromatic content of greater than 50% by weight, or greater than 70% by weight.

In another aspect the present disclosure provides an oligomeric or polymeric product produced by any one of the herein disclosed processes.

In some embodiments the oligomers and/or polymers comprise linear chains comprising polyaromatic hydrocarbon moieties and/or polyheterocyclic moieties.

In other embodiments the oligomers and/or polymers comprise crosslinked chains comprising polyaromatic hydrocarbon moieties and/or polyheterocyclic moieties.

In another aspect the present disclosure provides a thermoplastic material or thermoset material formed from any one of the processes disclosed herein.

In another aspect there is provide a thermoplastic or thermoset material comprising the oligomers and/or polymers disclosed herein.

In another aspect the present disclosure provides a composite comprising an oligomer and/or polymer as disclosed herein and at least one other material, for example, a further polymer.

In another aspect the present disclosure provides an oligomer and/or polymer comprising a plurality of oligomerized and/or polymerized polyaromatic hydrocarbon molecules and/or polyheterocyclic molecules, wherein the oligomer and/or polymer comprise aryl-aryl, aryl-heteroaryl and heteroaryl-heteroaryl bonds and combinations thereof.

In another aspect the present disclosure provides an oligomer and/or polymer comprising a plurality of oligomerized and/or polymerized polyaromatic hydrocarbon molecules and/or polyheterocyclic molecules, wherein the oligomer and/or polymer comprise linking units between aryl and/or heteroaryl rings. In some embodiments the linking units comprise one or more heteroatoms. The heteroatoms may be selected from oxygen, nitrogen and sulfur and combinations thereof.

In another aspect the present disclosure provides an oligomer and/or polymer comprising a plurality of oligomerized and/or polymerized polyaromatic hydrocarbon molecules and/or polyheterocyclic molecules, wherein the oligomer and/or polymer comprise linking units between substituents on aryl or heteroaryl rings. In some embodiments the linking units comprise one or more heteroatoms. The heteroatoms may be selected from oxygen, nitrogen and sulfur and combinations thereof.

In another aspect the present disclosure provides a functionalized polyaromatic feedstock comprising a plurality of functionalized polyaromatic hydrocarbon molecules and/or functionalized polyheterocyclic molecules, wherein said plurality of functionalized polyaromatic hydrocarbon molecules and/or polyheterocyclic molecules comprise at least one common functional group.

The at least one common functional group may be selected from the group consisting of halide, aldehyde, ketone, carboxylic acid, ester, thiol, amine, amide, hydroxyl, isocyanide, azide, epoxide, cyclopropyl and olefin.

The plurality of functionalized polyaromatic hydrocarbon molecules and/or polyheterocyclic molecules may comprise 2 or more, or 5 or more, or 10 or more, or 20 or more, or 50 or more, or 100 or more, or 1,000 or more, or 5,000 or more, or 10,000 or more, or 100,000 or more, different functionalized molecules. Preferably, the plurality of functionalized polyaromatic hydrocarbon molecules and/or functionalized polyheterocyclic molecules comprises 100 or more different functionalized molecules.

There is also provided a functionalized polyaromatic feedstock comprising a plurality of functionalized polyaromatic hydrocarbon molecules and/or functionalized polyheterocyclic molecules wherein said plurality of functionalized polyaromatic hydrocarbon molecules and/or polyheterocyclic molecules comprise at least one common functional group selected from the group consisting of halide, aldehyde, ketone, carboxylic acid, ester, thiol, amine, amide, hydroxyl, isocyanide, azide, epoxide, cyclopropyl and olefin and wherein the plurality of functionalized polyaromatic hydrocarbon molecules and/or polyheterocyclic molecules comprise 50 or more, or 100 or more, or 1,000 or more, or 5,000 or more, or 10,000 or more, or 100,000 or more, different functionalized molecules.

Further features and advantages of the present disclosure will be understood by reference to the following drawings and detailed description.

DETAILED DESCRIPTION OF THE EMBODIMENTS

Figure 1:
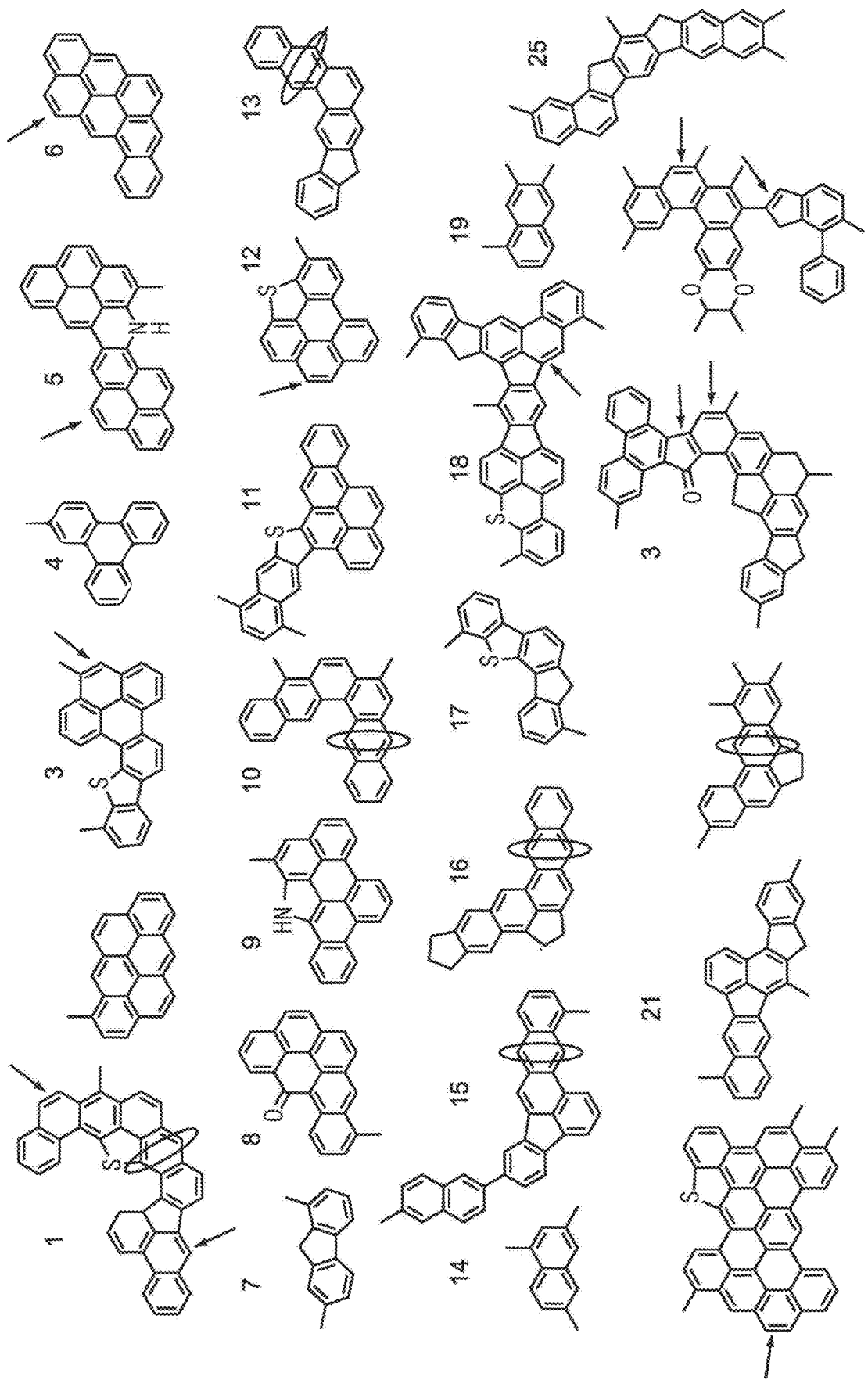
FIG. 1 illustrates the structures of various polyaromatic hydrocarbon molecules and polyheterocyclic molecules present in polyaromatic feedstock.

The following is a detailed description of the disclosure provided to aid those skilled in the art in practicing the present disclosure. Those of ordinary skill in the art may make modifications and variations in the embodiments described herein without departing from the spirit or scope of the present disclosure.

Although any compositions, processes and materials similar or equivalent to those described herein can also be used in the practice or testing of the present disclosure, the preferred compositions, processes and materials are now described.

It must also be noted that, as used in the specification and the appended claims, the singular forms 'a', 'an' and 'the' include plural referents unless otherwise specified. Thus, for example, reference to 'polyaromatic hydrocarbon' may include more than one polyaromatic hydrocarbon, and the like.

Throughout this specification, use of the terms 'comprises' or 'comprising' or grammatical variations thereon shall be taken to specify the presence of stated features, integers, steps or components but does not preclude the presence or addition of one or more other features, integers, steps, components or groups thereof not specifically mentioned.

Unless specifically stated or obvious from context, as used herein, the term 'about' is understood as within a range of normal tolerance in the art, for example within two standard deviations of the mean. 'About' can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term 'about'.

Any processes provided herein can be combined with one or more of any of the other processes provided herein.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as Hawley's Condensed Chemical Dictionary 14th Edition, by R. J. Lewis, John Wiley & Sons, New York, N.Y., 2001.

As used herein, the term 'polyaromatic feedstock' shall be understood in the broader sense of refinery and petrochemical operations, such as molecules in crude oil or the complex molecules generated during petrochemical processes, which include polyaromatic hydrocarbons (PAH) and aromatic hydrocarbons with heteroatoms (polyheterocyclics). The polyaromatic feedstock can be residues of petrochemical refining or extraction, such as vacuum residue, fluidic catalytic cracking ("FCC") bottoms (slurry oil, main column bottoms ("MCB")), steam cracker tar, asphaltenes, C3-C5 rock, bitumen, K-pot bottoms, lube extracts, various streams from refinery processes and other synthetic aromatic hydrocarbons.

As used herein, a 'polyaromatic hydrocarbon' refers to a hydrocarbon having at least two rings, at least one of which is aromatic. Polyaromatic hydrocarbons fall within the class of arene molecules, and may comprise one or more aromatic rings with 4- or 5- or 6- or 7-, or 8 or more-membered carbon rings. They may be either alternant aromatic hydrocarbons (benzenoids), or non-alternant hydrocarbons, which may be either non-alternant conjugated or non-alternant non-conjugated hydrocarbons. Examples of polyaromatic hydrocarbons include, but are not limited to, acenaphthene, acenaphthylene, anthanthrene, anthracene, azulene, benzo[a]anthracene, benzo[a]fluorine, benzo[c]phenanthrene, benzopyrene, benzo[a]pyrene, benzo[e]pyrene, benzo[b]fluoranthene, benzo[j]fluoranthene, benzo[k]fluoranthene, benzo[ghi]perylene, chrysene, corannulene, coronene, dicoronylene, diindenoperylene, fluorene, fluoranthene, fullerene, helicene, heptacene, hexacene, indene, kekulene, naphthalene, ovalene, pentacene, perylene, phenalene, phenanthrene, dihydrophenanthrene, picene, pyrene, tetracene, triphenylene, and their isomers or derivatives or combinations or condensed forms.

The polyaromatic hydrocarbons may also comprise molecules which contain the above disclosed polyaromatic molecules as fragments within larger molecules.

As used herein, a 'polyheterocyclic molecule' refers to a heterocyclic molecule having at least two rings, at least one of which is aromatic. Polyheterocyclic molecule can also be referred to as heteroaromatic molecules. As used herein, a heterocyclic molecule is cyclic aromatic molecule that includes at least one heteroatom in an aromatic ring. Typical heteroatoms include oxygen, nitrogen, and sulfur. Examples of polyheterocyclic molecules include, but are not limited to, acridine, benzimidazole, 2H-1-benzothine, benzthiazole, benzo[b]furan, benzo[b]thiophene, benzo[c]thiophene, carbazole, cinnoline, dibenzothiophene, iminodibenzyl, 1H-indazole, indole, indolizine, isoindole, isoquinoline, 1,5-naphthyridine, 1,8-naphthyridine, phenanthridine phenanthroline, phenazine, phenoxazine, phenothiazine, phthalazine, quinazoline, quinoline, 4H-quinolizine, thianthrene, and xanthene and their isomers, derivatives or combinations.

The polyheterocyclic molecules may also comprise molecules which contain the above disclosed polyheterocyclic molecules as fragments within larger molecules.

As used herein, the term 'bridged bicyclic' refers to a carbocyclic or heterocyclic ring system fused to another ring system on non-adjacent atoms. Examples of bridged bicyclic ring systems include, but are not limited to, bicyclo[2,2,1]heptane, bicyclo[3,3,1]nonane, bicyclo[2,2,1]hexane and 2-azabicyclo[3.3.1]nonane.

The present disclosure provides a process for oligomerizing or polymerizing polyaromatic feedstock, said process comprising:
(a) contacting the polyaromatic feedstock with one or more first reagents under conditions effective to introduce one or more functional groups into a plurality of different polyaromatic hydrocarbon molecules and/or different polyheterocyclic molecules present in the polyaromatic feedstock; and
(b) treating the functionalized polyaromatic feedstock under conditions effective to oligomerize or polymerize at least some of the plurality of functionalized molecules; wherein the oligomerization or polymerization is effected via the functional groups introduced in (a).

Halogenation of Polyaromatic Feedstock

The following illustrates exemplary embodiments wherein step (a) comprises functionalization with halogen.

Numerous polyaromatic hydrocarbon molecules and polyheterocyclic molecules present in polyaromatic feedstock and which contain carbon-carbon double bonds having olefinic character may react with halogens so as to introduce halogen functionality. Equation (12) depicts a general reaction

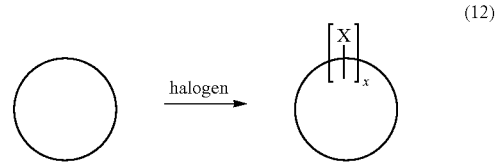

(12)

wherein the reactant circle represents, independently, one of a plurality of polyaromatic hydrocarbon molecules and/or polyheterocyclic molecules present in polyaromatic feedstock, X represents halogen attached to a ring carbon atom, a ring heteroatom, a ring substituent and combinations thereof, and x represents the number of halogen functions and is an integer greater than or equal to 1.

In a model system, phenanthrene, which contains a carbon-carbon double bond having olefinic character, may react with bromine to form 9-bromophenanthrene as illustrated in equation (13).

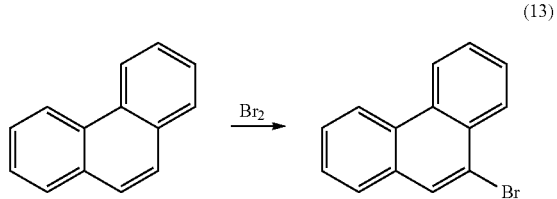

(13)

Polyaromatic feedstock comprises numerous polyaromatic hydrocarbon molecules and/or polyheterocyclic molecules many of which contain one or more K regions.

Equation (14) illustrates treatment of a polyheterocyclic molecule exemplary of that contained in polyaromatic feedstock with halogen or a source of halogen to produce a halogen functionalized molecule.

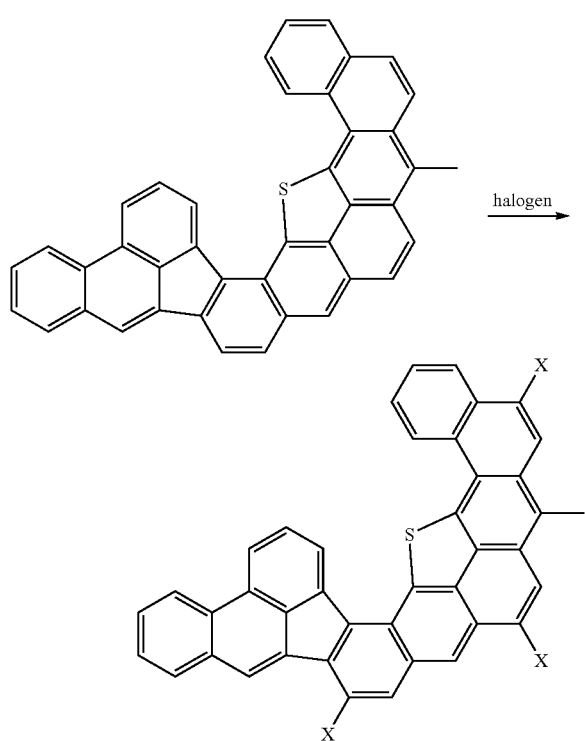

(14)

The illustrated reaction makes use of certain carbon-carbon double bonds in the molecule which have olefinic character and in this example three halogen functionalizations are effected.

It will be appreciated that other polyaromatic hydrocarbon molecules or polyheterocyclic molecules may comprise two, three or even more double bonds having olefinic character which may react with halogen. As such, different numbers of halogen functions may be present in different molecules.

In some embodiments the herein disclosed functionalized polyaromatic feedstocks may comprise polyaromatic hydrocarbon molecules and/or polyheterocyclic molecules wherein individual molecules comprise a plurality of halogen functions. In some embodiments the molecules may, independently, comprise up to ten halogen functions or between two and eight halogen functions. For example the molecules may, independently, comprise two, or three, or four, or more halogen functions.

A single ring may comprise two or more halogen functions. Additionally or alternatively multiple rings of a single molecule may comprise one or more halogen functions.

In some embodiments the halogen content of the functionalized polyaromatic feedstock may be between 1 and 80% by weight, based on the total weight of the feedstock.

The halogen function may be independently selected from fluoro, chloro, bromo, iodo and mixtures thereof.

Halogenation Reagents and Process

The process may be carried out over a wide range of temperatures and is carried out at a temperature sufficient to effect reaction. The temperature is preferably between about 25° C. to about 150° C., more preferably between about 25° C. to about 120° C., even more preferably between about 70° C. to about 110° C. and most preferably between about 60° C. and 100° C. Preferably the reaction temperature is above 25° C., or above 50° C., or above 60° C. or above 70° C. or above 80° C. In some preferred embodiments the process may be performed at ambient temperature. The reaction can be carried out at a single temperature or, sequentially, at different temperatures.

The ratio of halogen or source of halogen to polyaromatic feedstock is normally in the range of 500 to 1.0, preferably 200 to 1.0, more preferably in the range of 100 to 1.0 to 50 to 1.0. Preferably an excess of halogen is utilized but the ratio chosen for the reaction will affect the degree of conversion.

If desired, the reaction may be carried out in a neutral solvent such as mineral oil, an inert hydrocarbon solvent, or a halogenated solvent such as carbon tetrachloride, but usually no solvent is necessary.

Reaction time may vary and is dependent on the reaction temperature, ratio of reactants and pressure. The reaction will preferably be carried out over a period of 1 to 10 hours, more preferably over a period of 3 to 24 hours, and most preferably over a period of 4 to 16 hours.

The extent of reaction may be monitored by measuring the halogen content of the product.

Oligomerizing and/or Polymerizing Halogenated Polyaromatic Feedstocks

The halogen functionalized polyaromatic feedstocks of the present disclosure may undergo further reactions in which, for example, aryl or heteroaryl rings functionalized by halogen are oligomerized and/or polymerized. Such oligomerization and/or polymerization may be effected by heat, light, one or more second reagents, and combinations thereof.

Equation (15) illustrates a general scheme wherein halogen (X) functionalized polyaromatic compounds and/or polyheterocyclic compounds are oligomerized and/or polymerized to produce higher molecular weight oligomers and/or polymers.

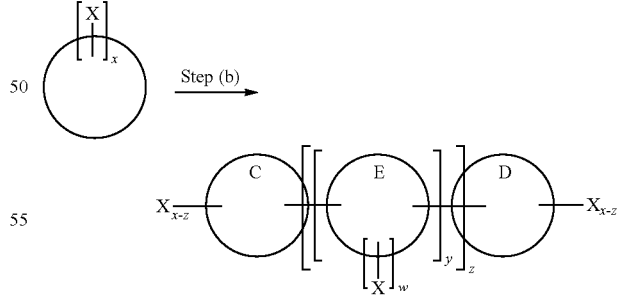

(15)

wherein the reactant represents a plurality of halogen functionalized polyaromatic hydrocarbon molecules and/or halogen functionalized polyheterocyclic molecules, the circles C, D and E represent, independently, polyaromatic hydrocarbon moieties or polyheterocyclic moieties, X represents halogen attached to a ring carbon atom, a ring heteroatom, an optional ring substituent and combinations thereof, the lines joining the circles C and D to E in the oligomerized and/or polymerized product represent a carbon-carbon bond or carbon-heteroatom bond, x and w represent the number of halogen functions X, wherein x is an integer greater than or equal to 2 and w is a whole number greater than or equal to zero, y represents the number of moieties $E-X_w$ which link moieties C and D, z represents the number of links between moieties C and D, and y is a whole number greater than or equal to zero.

Preferably, y is an integer greater than or equal to 1, more preferably greater than or equal to 5, or greater than or equal to 10, or greater than or equal to 20, or greater than or equal to 50. Preferably x is from 1 to 8. Preferably z is from 1 to 4.

The extent of the oligomerization and/or polymerization reaction may be monitored by measuring the decrease in halogen content of the product.

When the first reagent is halogen the second reagent may be a reagent capable of coupling halogenated aryl or halogenated heteroaryl moieties.

Alternatively or additionally the coupling may be effected by heat and/or light.

Suitable aryl or heteroaryl coupling agents include, for example, metals or metal complexes.

Coupling reagents useful in effecting oligomerization and/or polymerization include, but are not limited to, metals such as Pt, Pd, Zn, Mg, Cu, Au, Ag, Sn, Zn, and organic chelated transition metals in combination with a base, such as those employed in Suzuki-Miyaura, Heck, Negishi, or Buckwald-Hartwig coupling.

One particular example of an aryl coupling agent is copper, for example, as utilized in the so-called Ullmann reaction.

This illustrated in equation (16) below for the model compound 9-bromophenanthrene.

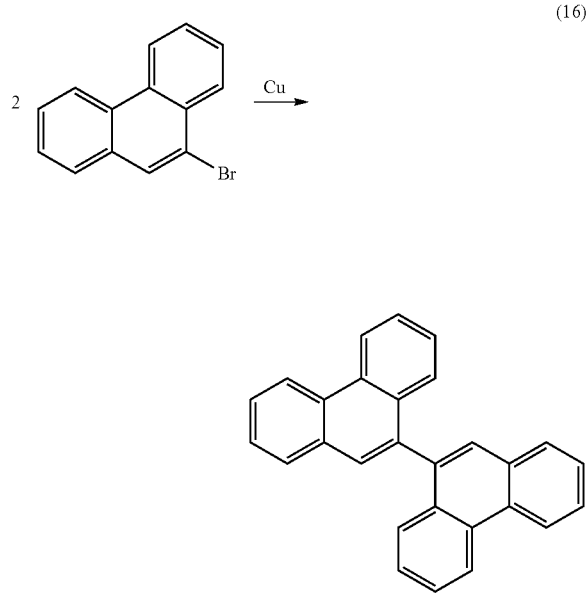

(16)

This concept may be extended to the halogenated polyheterocyclic molecule discussed above, and as depicted in equation (17).

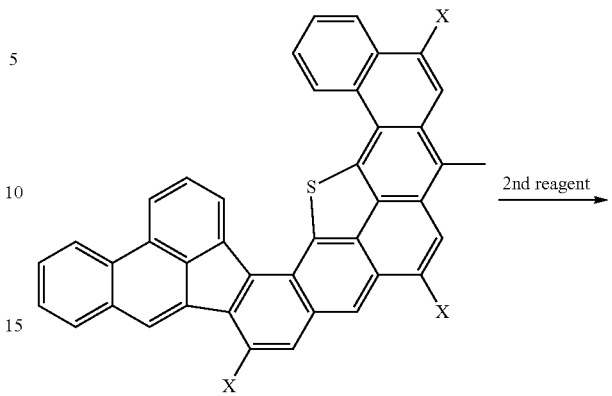

(17)

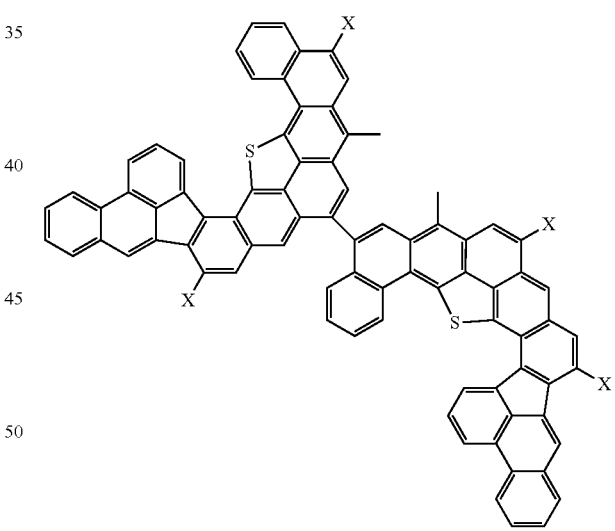

Treatment with a second reagent, such as copper metal, results in aryl-aryl coupling and formation of a dimer. Further oligomerization and/or polymerization of the product, via available halogen functionalization, with the same or different halogen functionalized molecules present in the functionalized polyaromatic feedstock leads to higher molecular weight oligomers and/or polymers. The so-formed oligomers and/or polymers may be thermoplastic or thermoset.

Oligomeric and/or polymeric products may undergo further cyclization reactions at high temperature as illustrated in equation (18) so as to provide further crosslinks.

(18)

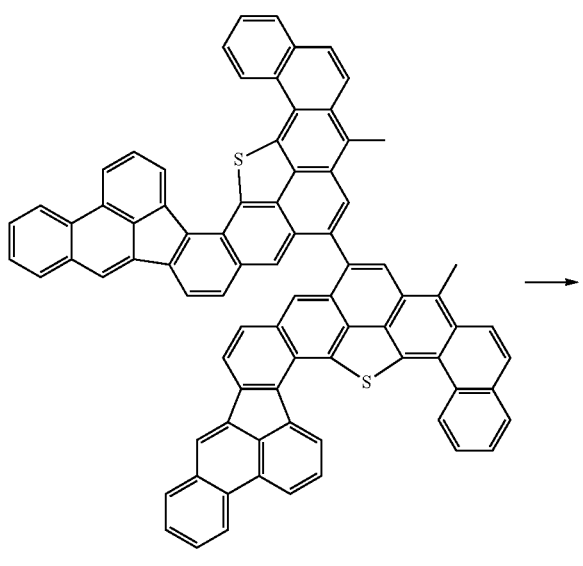

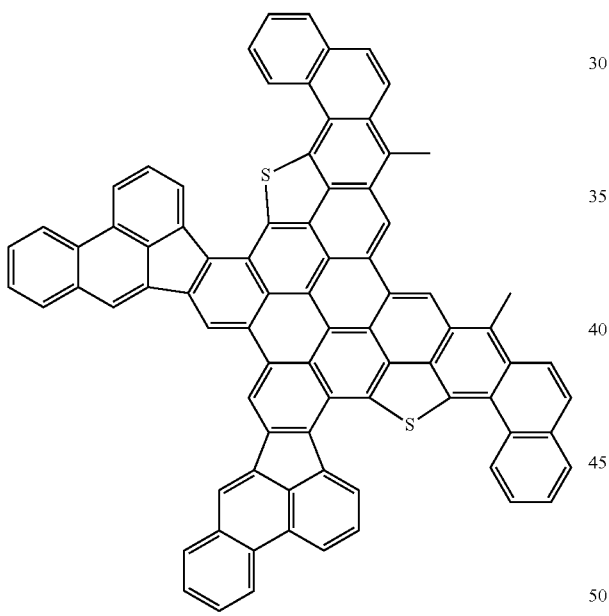

While the illustrated schemes demonstrate linking between molecules of the same structure it will be appreciated that molecules having different structures may also link, so long as they contain at least two halogen functions.

In some embodiments, molecules may be linked through more than one link.

In some embodiments, a plurality of the same or different molecules may be linked so to provide extended networks having high molecular weight.

In some embodiments, linking subsequent to halogen functionalization may be effected by heating to high temperature without the use of a second reagent. The temperature range may be in the range of 300-600° C. This thermally induced linking reaction may occur in combination with catalytic reactions.

In some embodiments, the catalyst may be an acid, either in the solid, liquid, or gaseous state. The acid may be a Lewis acid, a Bronsted acid or a super acid. Exemplary acids include sulfuric acid, phosphoric acid, hydrochloric acid, hydrofluoric acid, hydrobromic acid or organic acids such as acetic acid, trifluoroacetic acid and trichloroacetic acid. Such acid catalyzed crosslinking reactions may occur via carbenium ions intermediates. Elevated temperatures may facilitate reaction, for example in the range of 30-400° C.

In some embodiments, light may be used to effect the oligomerization and/or crosslinking reaction in the absence of a second reagent. UV light, broad wavelength light (Halogen lamp) or single wavelength LED light sources, or within the range of 200 nm to 700 nm. The reaction may occur via excited photochemical states which produce radicals and diradicals facilitating oligomerization and/or polymerization.

Use of Oligomeric and/or Polymeric Compositions Formed from Halogenated Polyaromatic Feedstock It is envisaged that the compositions formed through halogenation and subsequent aryl coupling may be useful as, for example, binder materials or as components in blends, such as polymer blends.

Epoxidation of Polyaromatic Feedstock

The following illustrates exemplary embodiments wherein step (a) comprises functionalization with epoxides.

Numerous polyaromatic hydrocarbon molecules and polyheterocyclic molecules present in polyaromatic feedstock and which contain carbon-carbon double bonds having olefinic character may react with epoxidation reagents so as to introduce epoxide functionality.

In some embodiments equation (19) represents a general reaction scheme whereby a polyaromatic hydrocarbon molecule or polyheterocyclic molecule is treated with an epoxidation reagent to form an epoxide.

$$\bigcirc \xrightarrow{\text{epoxide}} \bigcirc \!\!\left[\!\!\overset{O}{\triangle}\!\!\right]_x \tag{19}$$

wherein the reactant circle, independently, represents one of a plurality of polyaromatic hydrocarbon molecules and/or a polyheterocyclic molecules present in a polyaromatic feedstock, O represents the oxygen atom of an epoxide ring formed with ring carbon atoms, ring heteroatoms, and combinations thereof, and x represents the number of epoxide rings and is an integer greater than or equal to 1.

It will be appreciated that other polyaromatic hydrocarbon molecules or polyheterocyclic molecules may comprise two, or three or even more double bonds having olefinic character which upon treatment with an epoxidation reagent may be converted to epoxide rings. As such, multiple epoxide rings may be present in a single molecule.

In a model reaction, treatment of phenanthrene, which contains a carbon-carbon double bond having olefinic character, with dimethyldioxirane proceeds as illustrated in equation (20).

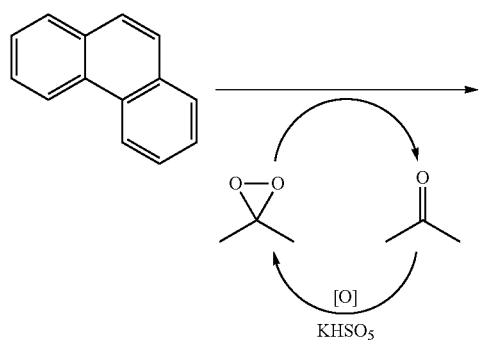

(20)

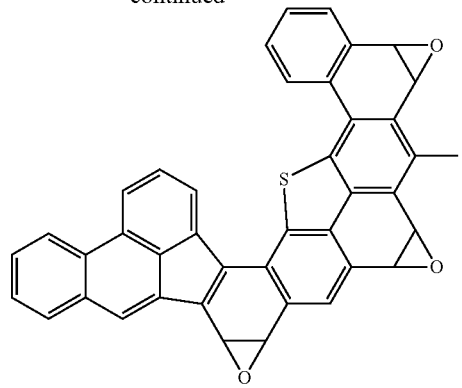

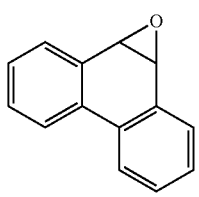

Dimethyldioxirane may be formed through treatment of acetone with potassium peroxymonosulfate. An advantage of this process is that the only by-product of epoxidation is acetone which may be recycled.

Many polyaromatic hydrocarbon molecules and polyheterocyclic molecules may undergo similar reactions to form epoxide rings.

FIG. 1 illustrates a number of molecules recently discovered to be present in polyaromatic feedstock. The carbon-carbon double bonds highlighted with arrows have olefinic character and the present inventors envisaged these may undergo epoxidation.

FIG. 1 also illustrates, as highlighted with ovals, sites where epoxidation may form bridged bicyclic ring structures having a bridging oxygen atom.

One example of the epoxidation of a molecule present in polyaromatic feedstock is illustrated in equation (21). In this case multiple carbon-carbon double bonds having olefinic character are present leading to multiple epoxide functionalization.

(21)

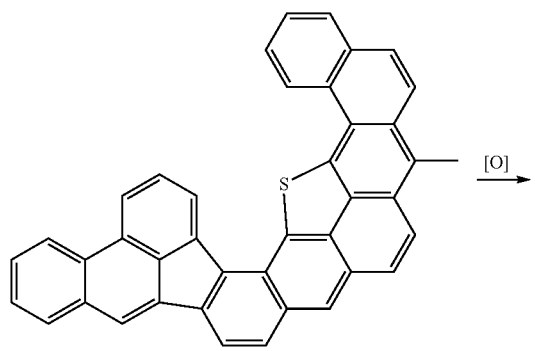

Epoxidation Reagents and Process

Any epoxidation reagent capable of reacting with olefins may be utilized to form the herein disclosed compositions. Such reagents are well known to the skilled person.

Examples include, peracids, such as peracetic acid or pertrifluoroacetic acid, alkylhydroperoxides, such a t-butylhydroperoxides, Sharpless epoxidation, hydrogen peroxide, or via halohydrins.

The treatment of a mixture of different polyaromatic hydrocarbon molecules and/or different polyheterocyclic molecules in polyaromatic feedstock with epoxidation reagents may proceed with or without added solvent.

The processes may be carried out over a wide range of temperatures and is carried out at a temperature sufficient to effect reaction. The temperature is preferably between about 25° C. to about 150° C., more preferably between about 25° C. to about 120° C., even more preferably between about 70° C. to about 110° C. and most preferably between about 60° C. and 100° C. Preferably the reaction temperature is above 25° C., or above 50° C., or above 60° C. or above 70° C. or above 80° C. In some preferred embodiments the process may be performed at ambient temperature. The reaction can be carried out at a single temperature or, sequentially, at different temperatures.

The ratio of epoxidation reagent to polyaromatic feedstock is normally in the range of 500 to 1.0, preferably 200 to 1.0, more preferably in the range of 100 to 1.0 to 50 to 1.0. Preferably an excess of epoxidation reagent is utilized but the ratio chosen for the reaction will affect the degree of conversion.

Reaction time may vary and is dependent on the reaction temperature, ratio of reactants and pressure. The reaction will preferably be carried out over a period of 1 to 10 hours, more preferably over a period of 3 to 24 hours, and most preferably over a period of 4 to 16 hours.

Polymeric and/or Oligomeric Compositions Formed from Epoxidated Molecules

A plurality of epoxidated molecules, as disclosed herein, may be contacted with a reagent, preferably a reagent comprising at least two functional groups, more preferably a reagent comprising active hydrogen moieties, so as to oligomerize and/or polymerize the epoxidated molecules. A general reaction is illustrated in equation (22)

(22)

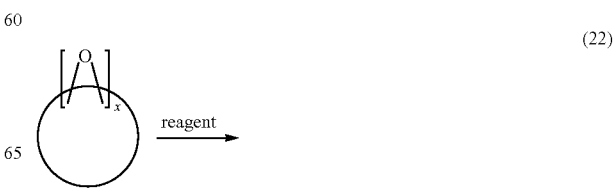

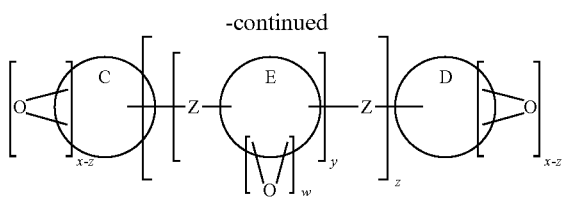

wherein the reactant represents a plurality of epoxidated polyaromatic hydrocarbon molecules and/or epoxidated polyheterocyclic molecules, the circles C, D and E represent, independently, polyaromatic hydrocarbon moieties or polyheterocyclic moieties, O represents the oxygen atom of an epoxide ring formed with ring carbon atoms, ring heteroatoms, and combinations thereof, Z is a linking moiety at least partially derived from the reagent, x is an integer greater than or equal to 2, y represents the number of moieties $Z$-$E(=O)_w$ which link moieties C and D, and z represents the number of links between moieties C and D, y and w are a whole numbers greater than or equal to zero, and z is an integer greater than or equal to 1.

Preferably, y is an integer greater than or equal to 2, more preferably greater than or equal to 5, or greater than or equal to 10, or greater than or equal to 20.

Any molecule containing at least two functional groups and preferably comprising active hydrogen moieties may react with the epoxidated compositions to form oligomeric and/or polymeric compositions. Common molecules which comprise suitable functional groups include amines, carboxylic acids, acid anhydrides, phenols, alcohols and thiols.

The following equation (23) illustrates a model reaction, in which an epoxidated species is treated with a reagent (H-A-H) comprising two active hydrogen moieties (A=for example, alkyl chain).

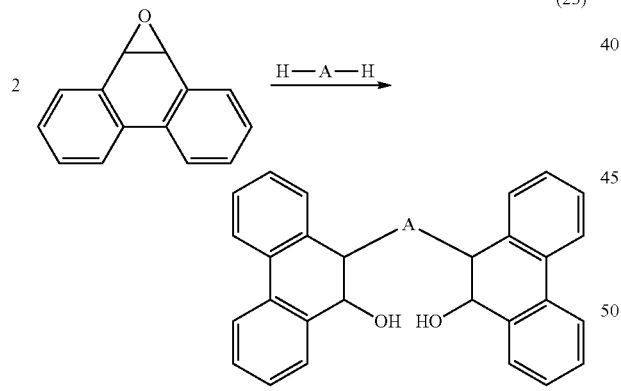

(23)

While the illustrated scheme demonstrates linking between molecules of the same structure it will be appreciated that molecules having different structures may also link.

In some embodiments, molecules may be linked through more than one link.

In some embodiments, a plurality of the same or different molecules may be linked so to provide extended arrays having high molecular weight.

In some embodiments the difunctional reagent includes polyamines, polyhydroxy compounds, elemental sulfur, and polythiols In some embodiments the reagent comprising at least two active hydrogen moieties is a polyamine. The polyamine may be selected from the group consisting of a diamines, triamines, tetraamines and mixtures thereof.

The polyamines may comprise two or more amine functionalities, or three or more, or four or more.

The polyamines may be primary amines or secondary amines or mixtures thereof.

A model reaction utilizing a diamine is illustrated in equation (24) (R is independently a linear or branched alkyl).

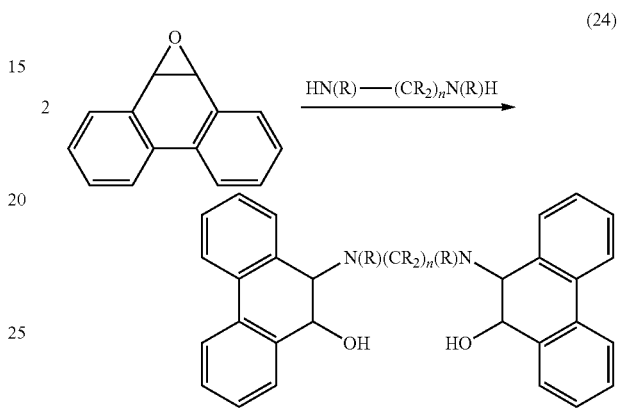

(24)

In a specific model reaction, epoxidated phenanthrene may be treated with ethylene diamine as illustrated in equation (25).

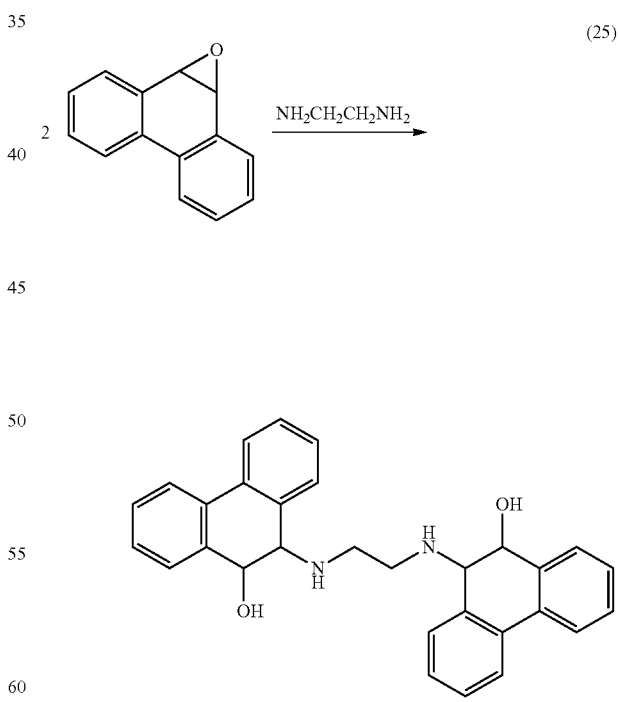

(25)

Equation (26) illustrates an epoxide functionalized polyheterocyclic molecule reacting with a tetraamine to form a linked species. In view of the three epoxide functions present in the epoxidated molecule, multiple links are possible.

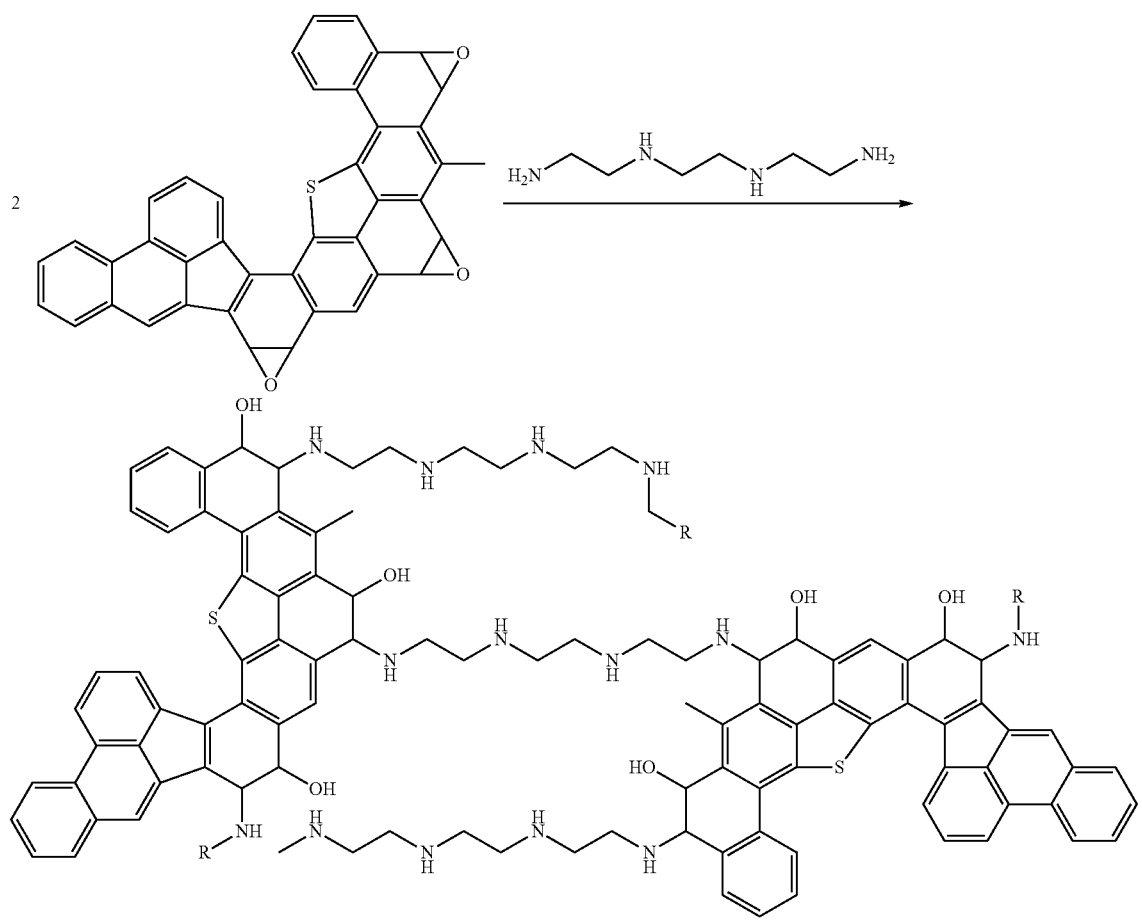

(26)

Furthermore, the presently disclosed epoxide functionalized polyaromatic hydrocarbon molecules and/or polyheterocyclic molecules may undergo intermolecular reaction with reactive substituents present in other molecules in the polyaromatic feedstock so as to further interlink the compositions.

Examples of diamines are diamines with a saturated $C_2$-$C_8$ alkyl chain, such as 1,6-hexamethylene diamine, 1,2-ethylene diamine, 1,3-propylene diamine, 1,4-butane diamine, 1,5-pentane diamine, 1,2-cyclohexane diamine and mixtures thereof.

Examples of triamines and polyamines are diethylene triamine, bis-hexamethylene-triamine, triethylene tetraamine and tetraethylene pentamine, higher amines, and mixtures thereof.

Other examples of readily available polyamines include those commonly found as hardeners in epoxy resins.

Use of Oligomeric and/or Polymeric Compositions Formed from Epoxidated Polyaromatic Feedstock The oligomeric and/or polymeric compositions may be useful as, for example, binder materials, as components in blends, such as polymer blends, or as composite components.

Carbene Treatment of Polyaromatic Feedstock

The following illustrates exemplary embodiments wherein step (a) comprises functionalization with reactive carbene intermediates generated in situ.

Numerous polyaromatic hydrocarbon molecules and polyheterocyclic molecules present in polyaromatic feedstock and which contain carbon-carbon double bonds having olefinic character may react with carbenes to form cyclopropane rings.

Equation (27) represents a general reaction scheme whereby a polyaromatic hydrocarbon molecule or a polyheterocyclic molecule is treated with a carbene to form a cyclopropane ring fused to the polyaromatic hydrocarbon molecule or a polyheterocyclic molecule (X=halide or linear or branched alkyl).

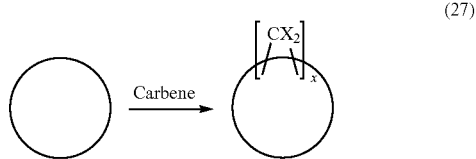

(27)

wherein the reactant circle, independently, represents a polyaromatic hydrocarbon molecule or a polyheterocyclic molecule, the carbon of $CX_2$ represents one vertex of a three membered ring formed with ring carbon atoms, ring heteroatoms, and combinations thereof, X is halide or linear or branched alkyl, x represents the number of three membered rings and is an integer greater than or equal to 1.

In a model reaction the following equation (28) illustrates phenanthrene treatment with a carbene to convert an olefinic double bond to a cyclopropane ring (X=substituent, preferably halogen).

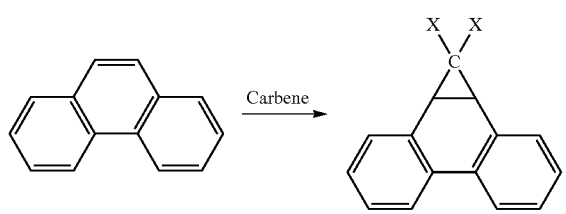

(28)

It will be appreciated that other polyaromatic hydrocarbon molecules or polyheterocyclic molecules may comprise two, or three or even more double bonds having olefinic character which upon treatment with a carbene may be converted to cyclopropane rings. As such, multiple cyclopropane rings may be present in a single molecule.

Preferred carbenes are dihalocarbenes.

Figure 2:
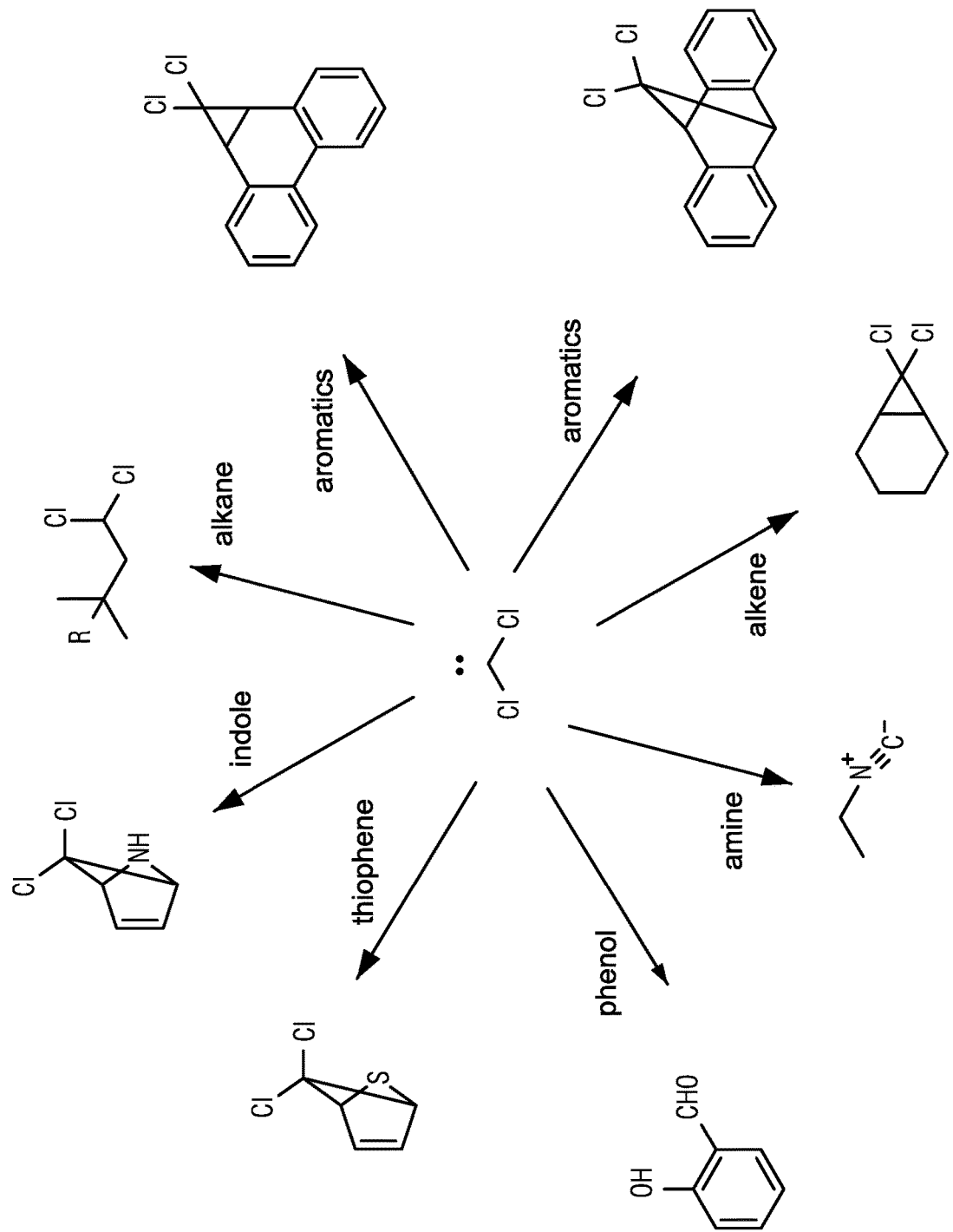
FIG. 2 illustrates the reactions of various organic molecules with dichlorocarbene.

As illustrated in FIG. 2, dihalocarbenes, such as dichlorocarbene, react with a variety of functional groups. One such reaction is a [1+2] cycloaddition with an alkene to form a dichlorocyclopropane as illustrated in reaction (29) for the model compound cyclohexene.

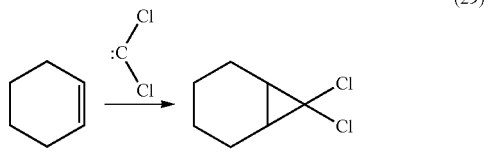

(29)

Various polyaromatic molecules and polyheterocyclic molecules which contain carbon-carbon double bonds having a high degree of olefinic character also react with dihalocarbene.

For example, phenanthrene and pyrene react with dichlorocarbene to form the products as illustrated in equations (30) and (31) respectively. These products contain a cyclopropane ring which forms part of the polyaromatic hydrocarbon ring system. The products also contain a geminal dichloro substituent on the carbon which is not common to other carbons in the polyaromatic hydrocarbon.

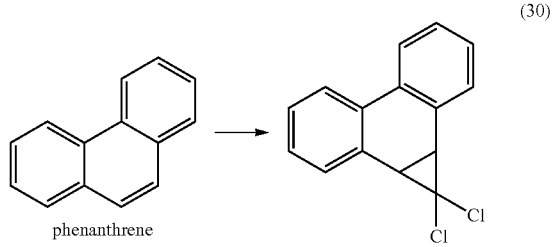

(30)

-continued

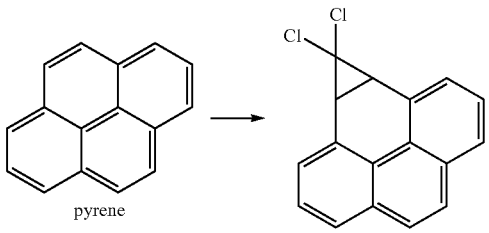

(31)

Many polyaromatic hydrocarbons molecules and polyheterocyclic molecules may undergo similar reactions to form cyclopropane rings. Referring to FIG. 2, dichlorocarbene also reacts with other organic functions to form various products. For example, reactions with various aromatics, such as thiophene, forms a bridged bicyclic structure. Reaction with an alkane forms a geminal dichloro alkane.

FIG. 1 illustrates a number of molecules recently discovered to be present in polyaromatic feedstock. The carbon-carbon double bonds highlighted with arrows have olefinic character and the present inventors envisaged these may be reactive to dihalocarbene.

FIG. 1 also illustrates, as highlighted with ovals, sites where dihalocarbenes may react to form bridged bicyclic ring structures.

Other chemical functions present in polyaromatic feedstock may also react with dihalocarbene, for example phenols and amines. For example primary amines react with dichlorocarbene to form isocyanides (Hoffman isocyanide synthesis) and phenols react with dichlorocarbenes to form aldehydes via the Reimer Tiemann reaction (see FIG. 2). All these functional groups may undergo further reactions via polymerization, condensation reactions, etc.

Dihalocarbene

The dihalocarbene for use in the reactions disclosed herein may be prepared in a number of ways which are well known to the skilled person.

For example, dichlorocarbene may be generated by reaction of chloroform and a base, such as potassium t-butoxide, or aqueous sodium hydroxide.

Phase transfer catalysts such as benzyltriethylammonium bromide may facilitate the migration of base in the organic phase.

Dichlorocarbene may also be generated by treating ethyl trichloroacetate with sodium methoxide. Additionally, phenyl(trichloromethyl)mercury decomposes to release dichlorocarbene.

Dichlorodiazirine generates dichlorocarbene via photolysis.

Dichlorocarbene can also be obtained by dechlorination of carbon tetrachloride with magnesium using ultrasound. This is useful as the dichlorocarbene may be used in the presence of ester or carbonyl molecules as it does not involve a strong base.

In some embodiments sonication, such as ultrasound. may be utilized to increase the rate of reaction.

In some embodiments one or more of fluoroform, chloroform, bromoform and iodoform may be utilized to generate the respective dihalocarbene.

In some embodiments mixed halo molecules like bromochloroform may be utilized so as to generate a mixed halocarbene.

Dihalocarbene Treatment

The treatment of polyaromatic feedstock with dihalocarbene may be facilitated with, for example, potassium t-butoxide in a single phase reaction. Alternatively, a two phase system utilizing a phase transfer catalyst such as benzyltriethylammonium bromide may be used.

Advantageously, in the case of dichlorocarbene the chloroform may serve as a solvent and unreacted chloroform is easily removed from the resulting products.

The process may be carried out over a wide range of temperatures and is carried out at a temperature sufficient to effect reaction. The temperature is preferably between about 25° C. to about 150° C., more preferably between about 25° C. to about 120° C., even more preferably between about 70° C. to about 110° C. and most preferably between about 60° C. and 100° C. Preferably the reaction temperature is above 25° C., or above 50° C., or above 60° C. or above 70° C. or above 80° C. In some preferred embodiments the process may be performed at ambient temperature. The reaction can be carried out at a single temperature or, sequentially, at different temperatures.

The ratio of dichlorocarbene to polyaromatic feedstock is normally in the range of 500 to 1.0, preferably 200 to 1.0, more preferably in the range of 100 to 1.0 to 50 to 1.0. Preferably an excess of dichlorocarbene is utilized but the ratio chosen for the reaction will affect the degree of conversion.

If desired, the reaction may be carried out in a neutral solvent such as mineral oil or an inert hydrocarbon solvent, but usually no solvent over and above chloroform is necessary. An advantage of the presently disclosed processes is that no further solvent or diluent is necessary and the reactions proceed smoothly in the presence of only chloroform.

Reaction time may vary and is dependent on the reaction temperature, ratio of reactants and pressure. The reaction will preferably be carried out over a period of 1 to 10 hours, more preferably over a period of 3 to 24 hours, and most preferably over a period of 4 to 16 hours.

Treatment of polyaromatic feedstock with dihalocarbene results in a viscosity increase and a flowability decrease. Further, the Tg, boiling point and melting points all increase. In some embodiments the molecular weight increases.

The degree of reaction between a dihalocarbene and polyaromatic feedstock can be monitored by measurement of Tg, boiling point or melting point, and also by quantitative chlorine analysis.

Oligomeric and/or Polymeric Compositions Formed from Cyclopropyl Functionalized Polyaromatic Feedstock The cyclopropyl functionalized polyaromatic feedstocks of the present disclosure may undergo further reactions. For example, the geminal dihalocyclopropane rings present in the functionalized compositions of the present disclosure may undergo further reactions, for example, geminal dihalocyclopropanes may be reduced to cyclopropanes or hydrolysed to give cyclopropanones by geminal halide hydrolysis. Dichlorocyclopropanes may also be converted to allenes via the Skattebol rearrangement.

These reactions may also involve the reverse of the addition of dichlorocarbene, that is release of dichlorocarbene from dichlorocyclopropane, but since the dichlorocarbene is so reactive, it may further react with other molecules. Therefore, in some embodiments the dichlorocarbene can be transferred from one molecule to another and thermodynamically induce further reaction.

Figure 3:
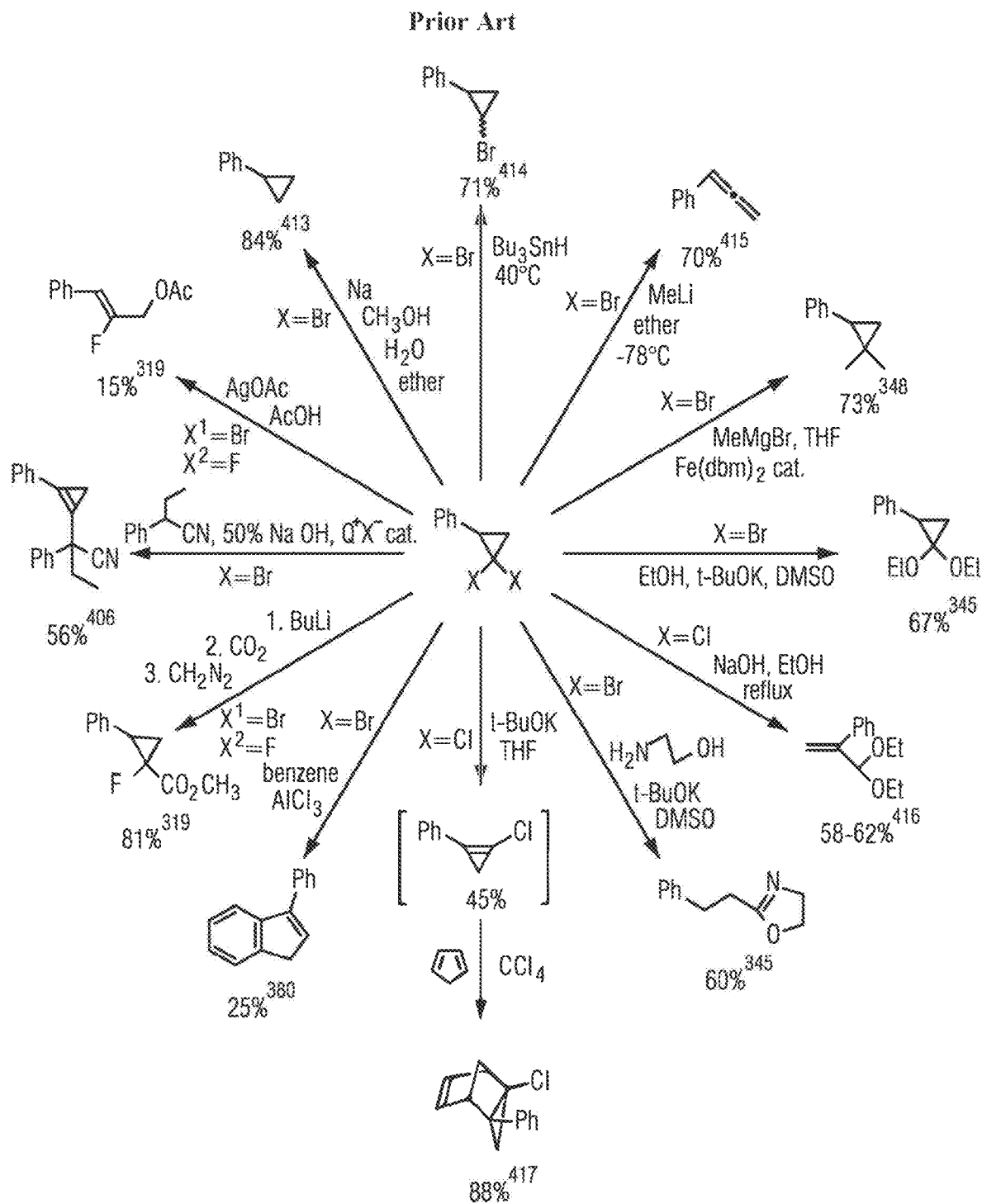
FIG. 3 illustrates various reactions of geminal dihalocyclopropane (reproduced from 'Syntheses of gem-Dihalocyclopropanes and Their Use in Organic Synthesis, Fedoryn'ski M., Chem. Rev. 2003, 103, 1099-1132).

FIG. 3 illustrates numerous possible reactions of geminal dihalocyclopropane to form various functional groups.

Figure 4:
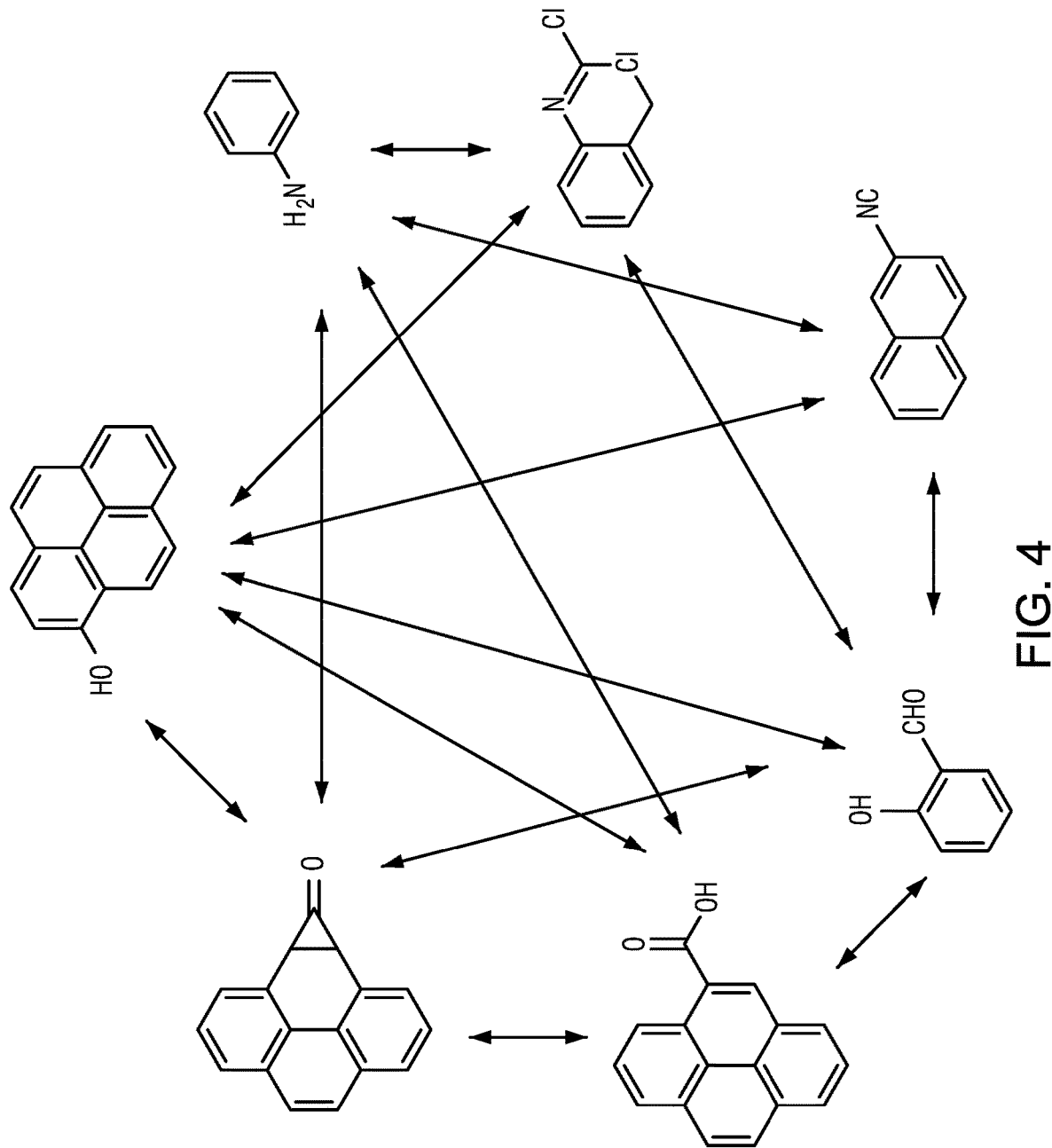
FIG. 4 illustrates various possible reactions between functionalized aromatic molecules.

Furthermore, the presently disclosed cyclopropyl functionalized polyaromatic feedstocks may undergo intermolecular reaction with reactive substituents present in other molecules in the feedstock so as to link the molecules. FIG. 4 illustrates how functionalized aromatic molecules, in particular polycyclic aromatics containing cyclopropanone rings, may inter-react so as to form larger molecules through, for example, cross-linking.

Figure 5:
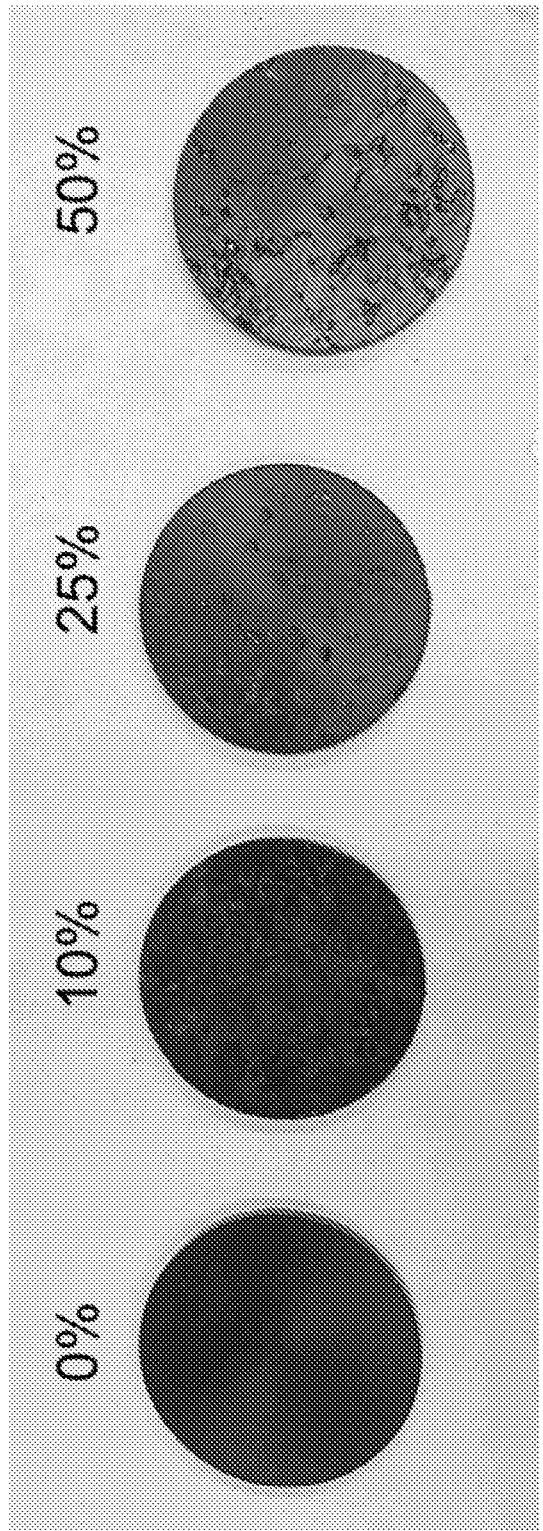
FIG. 5 is a photograph of composites of compositions according to the present disclosure and phenolic resin with different ratios.

Use of Oligomeric and/or Polymeric Compositions Formed from Cyclopropyl Functionalized Polyaromatic Feedstock It is envisaged that the compositions formed through heating and/or treating the cyclopropyl functionalized polyaromatic feedstocks with one or more reagents may be useful as, for example, binder materials or as components in blends, such as polymer blends. FIG. 5 illustrates photographs of composites formed from blending polymeric compositions as herein disclosed with phenolic resins.

EXAMPLES

Materials

Solvents and commercial reagents utilized in the experiments were used as purchased. Phenanthrene (98%), pyrene (98%), cyclohexene (99%), chloroform (99.5%), bromoform (99%), benzyltriethylalkylammonium bromide (99%), and diethyl ether (ACS anhydrous) were purchased from Sigma Aldrich. Dichloromethane was purchased from EMD Millipore Corporation. Sodium hydroxide was purchased from BDH VWR Analytical at 50% w/w.

General Methods

Phenanthrene, pyrene, cyclohexene or a polyaromatic feedstock sample of interest (~2 g, ~4 mmol) was charged into a 250 mL round-bottomed flask equipped with a PTFE stirring bar. Excess chloroform (~15 mL, ~185 mmol) was added and stirred at room temperature to yield a homogeneous solution. As the mixture was stirring, the phase transfer catalyst (PTC), for example benzyltriethylalkylammonium bromide, was added at 1-10% by weight relative to the model organic compound or petroleum sample. After the mixture was sufficiently stirred (approximately 1 hr), a mixture of sodium hydroxide and water (25-50%, —200 mmol) was slowly added via glass funnel over the course of a few minutes. The contents were then either held at ambient temperature or heated and allowed to reflux for 2 hrs. Upon cooling (when heating was utilized), the organic phase was extracted with adequate organic solvent. In the case of the model compounds diethyl ether was utilized. Polyaromatic feedstock samples required a more solvating component such as dichloromethane to extract. The organic phase was washed with water and dried under reduced pressure on a rotary evaporator. To ensure all water was removed, further drying was conducted in a vacuum oven operating at 110° C. overnight. Solid samples which were insoluble in organic solvents were filtered and washed with water. The sample was then dried in the same manner as previously stated. Due to the phase transfer catalysts involvement, complete salt removed and neutral sample required sufficient water washing.

Example 1

Figure 6:
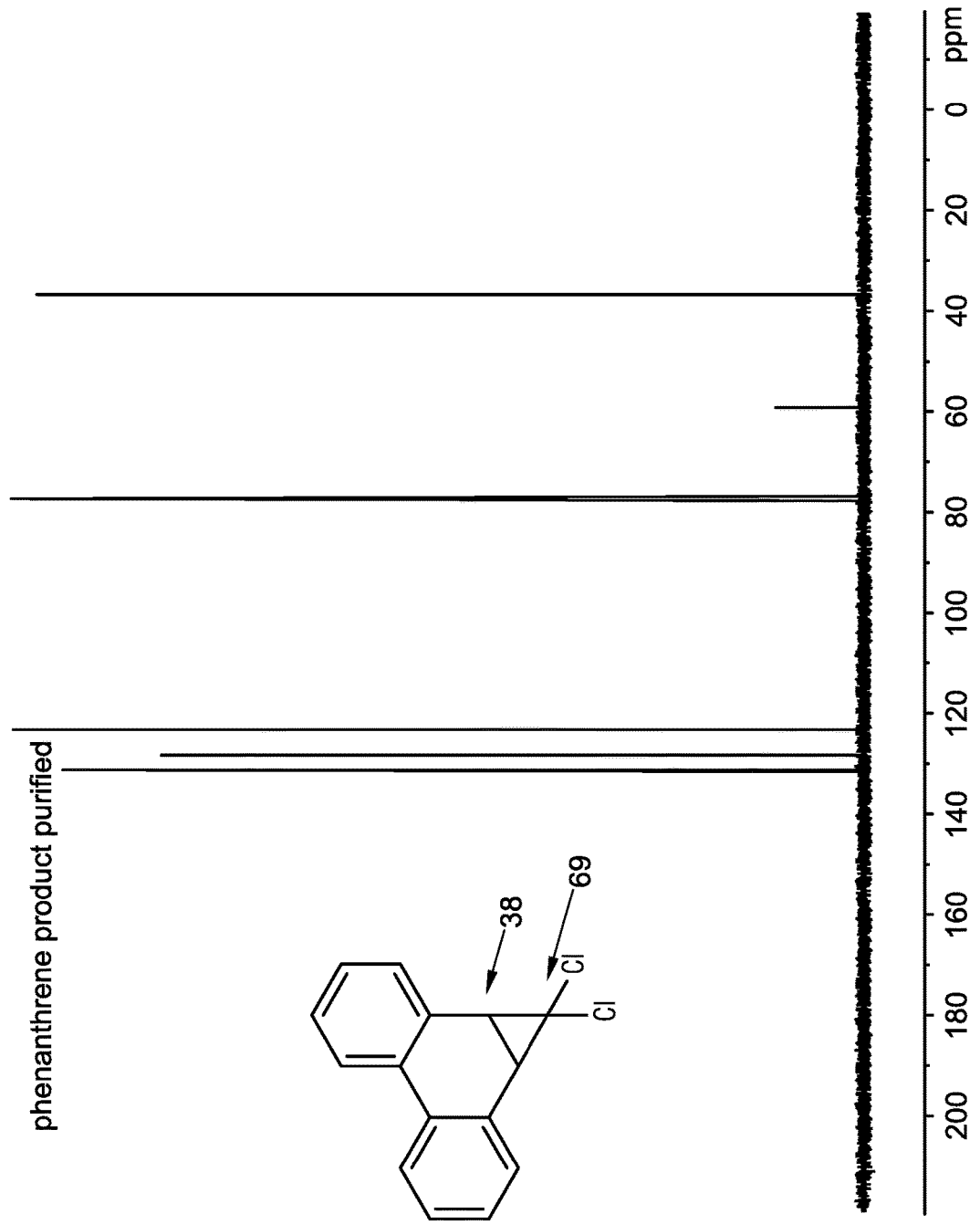
FIG. 6 illustrates the $^{13}C$ NMR spectrum of the reaction product of dichlorocarbene and phenanthrene.
Figure 7:
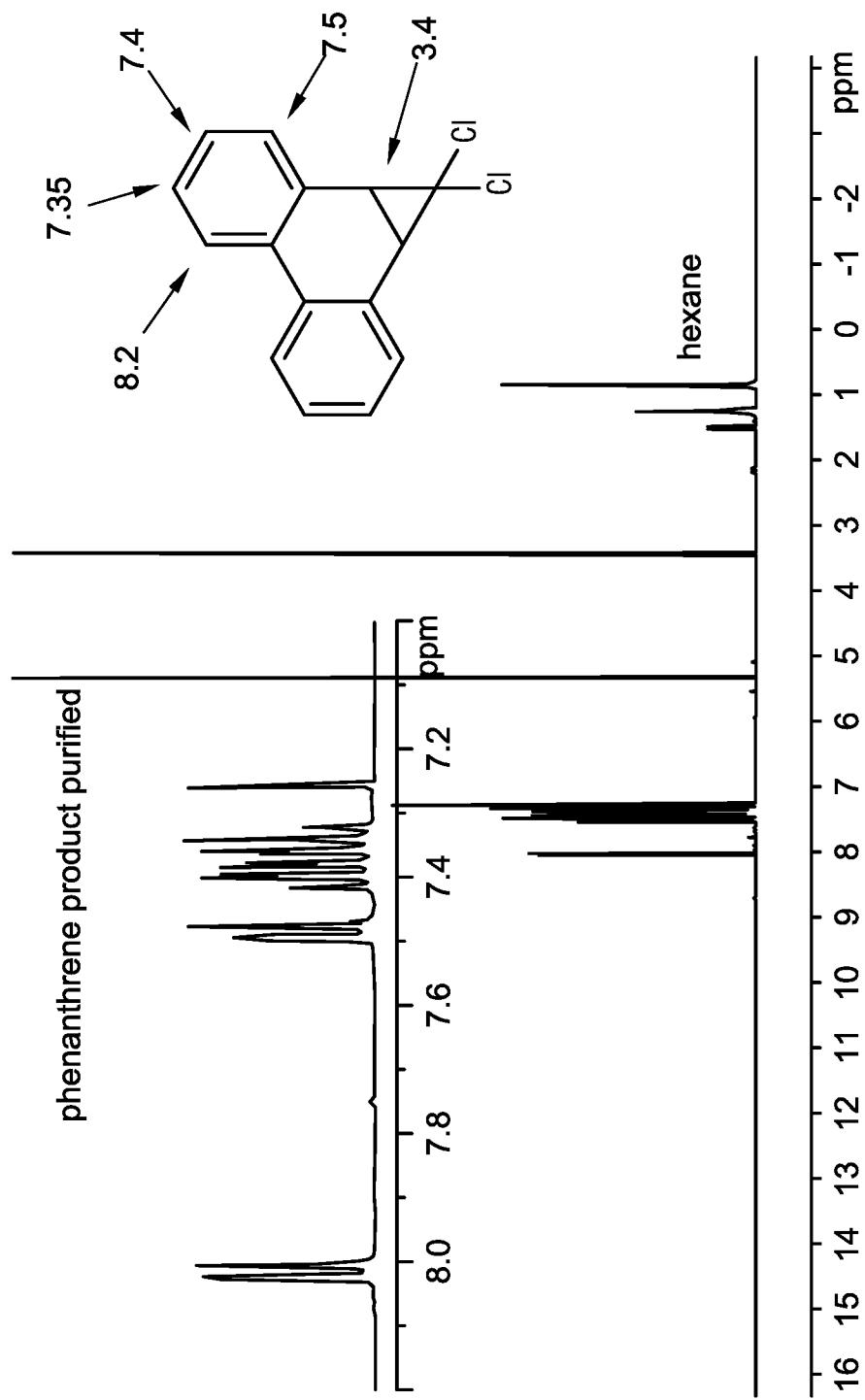
FIG. 7 illustrates the $^{1}H$ NMR spectrum of the reaction product of dichlorocarbene and phenanthrene.

FIG. 6 illustrates the $^{13}$H NMR spectrum and FIG. 7 the $^1$H NMR spectrum of the purified reaction product of phenanthrene and dichlorocarbene following the general method as outlined above.

Example 2

Figure 8:
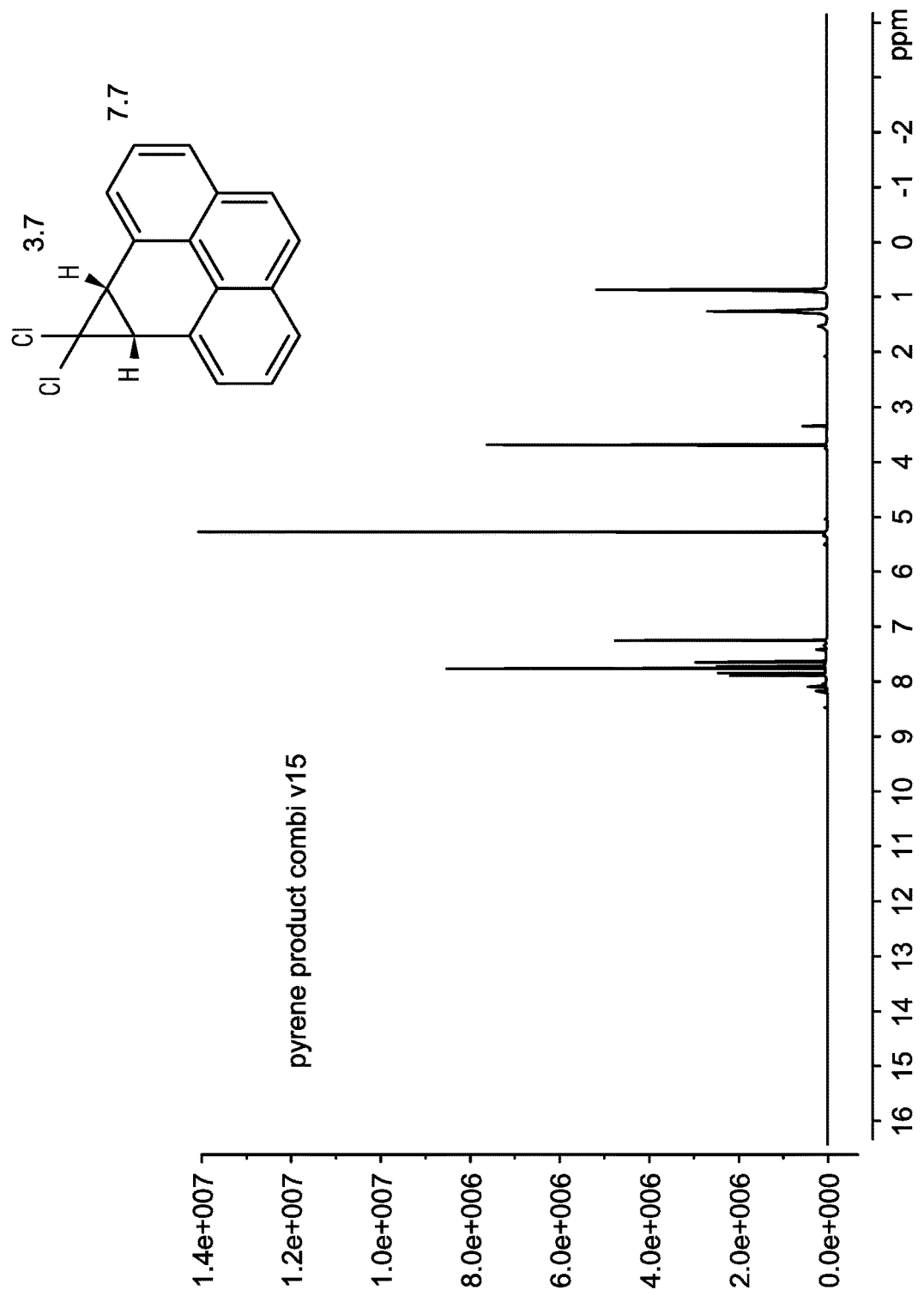
FIG. 8 illustrates the $^{1}H$ NMR spectrum of the reaction product of dichlorocarbene and pyrene.

FIG. 8 illustrates the $^1$H NMR spectrum of the purified reaction product of pyrene and dichlorocarbene following the general method as outlined above.

Example 3

A steam cracked tar was treated with dichlorocarbene for 2 hours at ambient temperature. The cracked tar was a flowable liquid however after treatment with dichlorocarbene a solid resulted (product 1). Table 1 summarizes elemental analyses results by weight of the starting material and product.

TABLE 1

| Sample | Sample No. | C % | H % | N % | S % | O % | Cl % |
|---|---|---|---|---|---|---|---|
| SC tar | A | 89.5 | 7.01 | <0.1 | 3.51 | 0.66 | — |
| Product 1 | B | 69.8 | 4.88 | <0.1 | 2.59 | 1.82 | 19.0 |
| Product 2 | C | 76.6 | 5.7 | <0.1 | 2.71 | 3.93 | 13.2 |

Analysis of the product for chlorine indicated 19% by weight, and 13.2% in another batch when less chloroform was used, indicating the amount of chlorine can be controlled through the amount of chloroform used. The steam cracked tar starting material contained no chlorine.

Figure 9A:
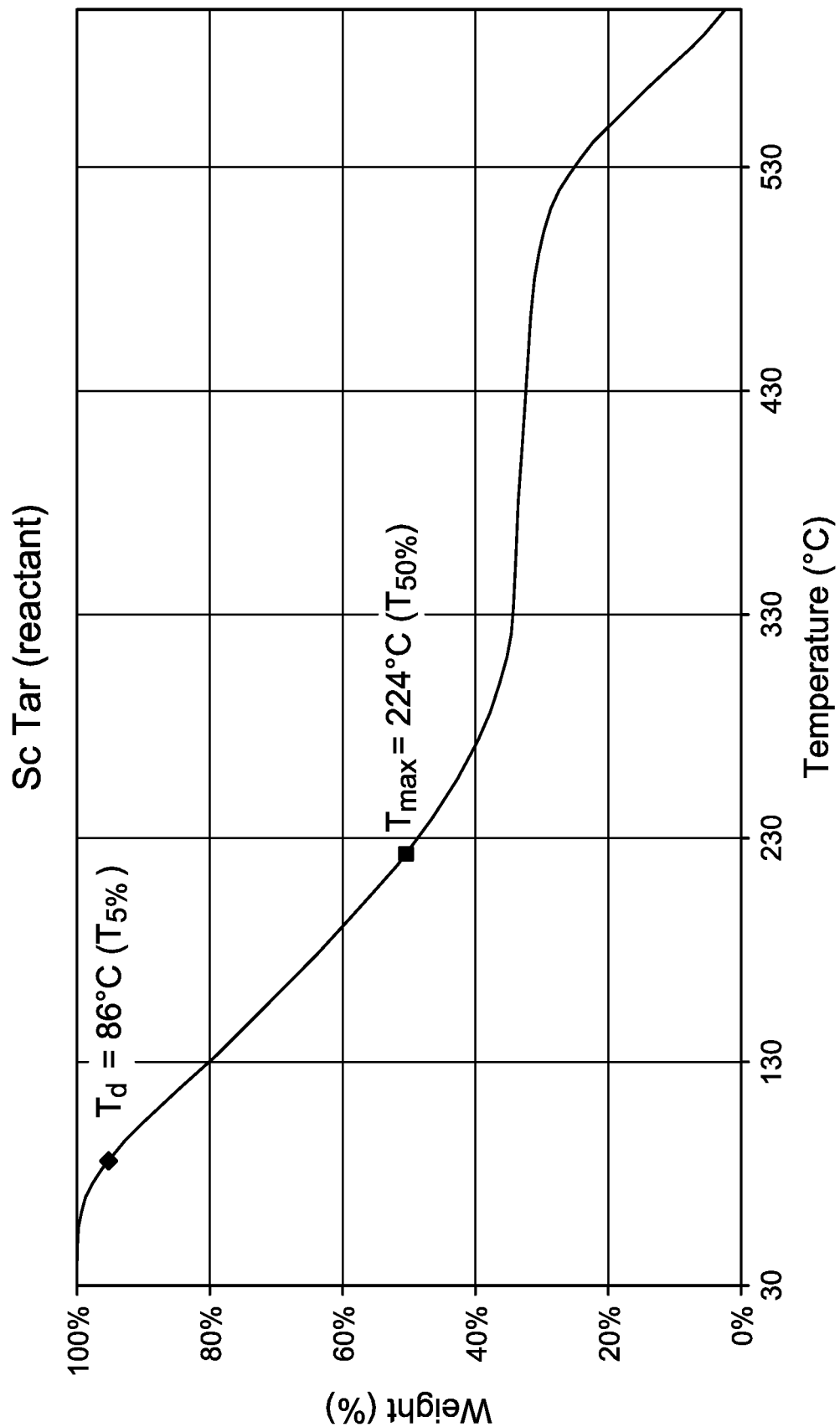
FIG. 9(a) illustrates the TGA of steam cracked tar (feed) and FIG. 9(b) illustrates the TGA of the product resulting from reaction with dichlorocarbene.
Figure 9B:
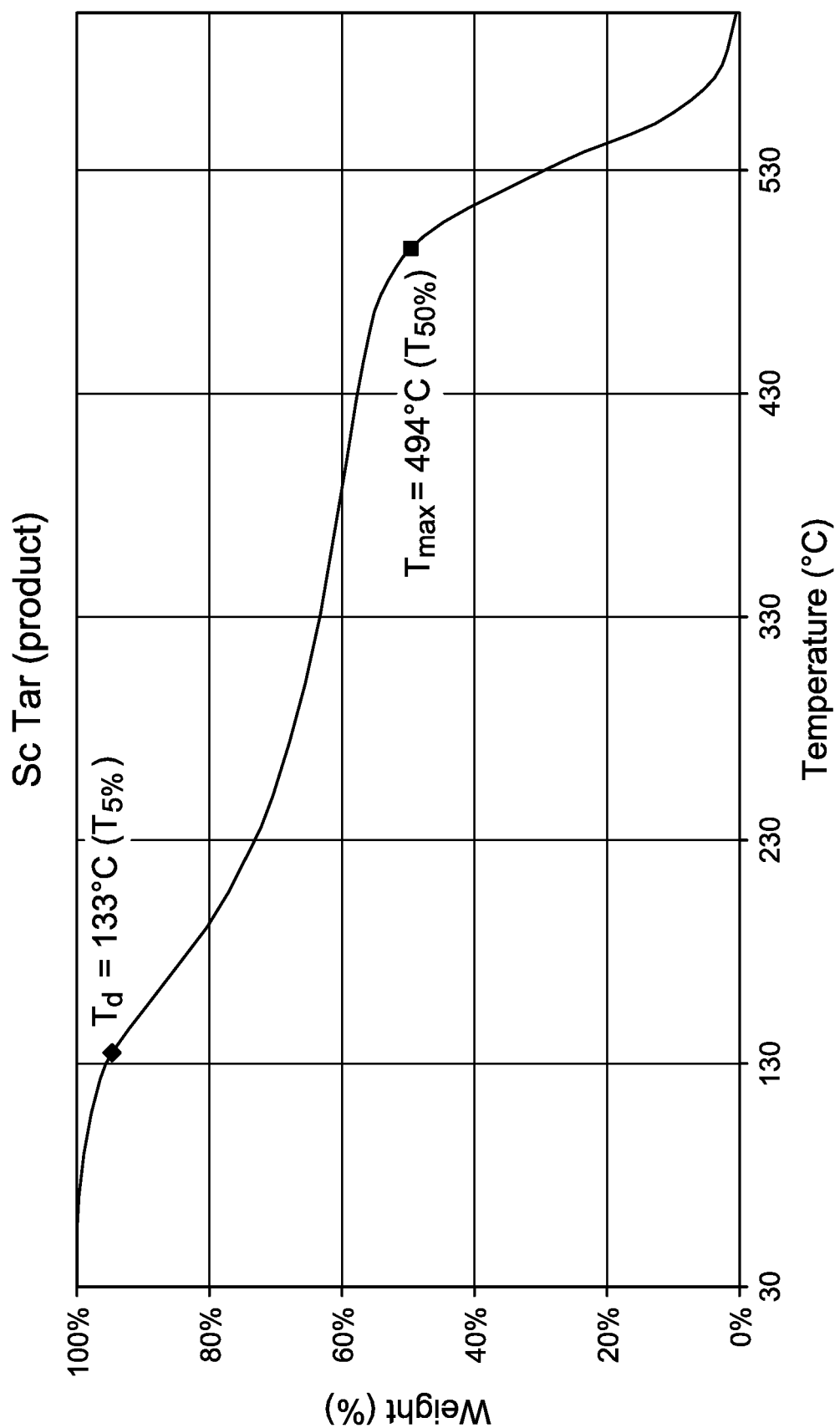

FIGS. 9(a) and 9(b) compare the TGA of the steam cracked tar reactant with the dichlorocarbene reaction product. It can be clearly seen that the product is much more thermally stable than the steam cracked tar reactant.

Example 4

A reaction mixture of steam cracked tar and dichlorocarbene was analyzed after 1, 2, 4 and 7 hours at ambient temperature. Table 2 collects the results of chlorine analysis.

TABLE 2

| Sample No. | Sample Time (hr) | Cl % by weight |
|---|---|---|
| D | 1 | 17.7 |
| E | 2 | 19.4 |
| F | 4 | 28.3 |
| G | 7 | 61.0 |

It is evident that the chlorine content of the steam cracked tar increases with an increase in treatment time.

Figure 10:
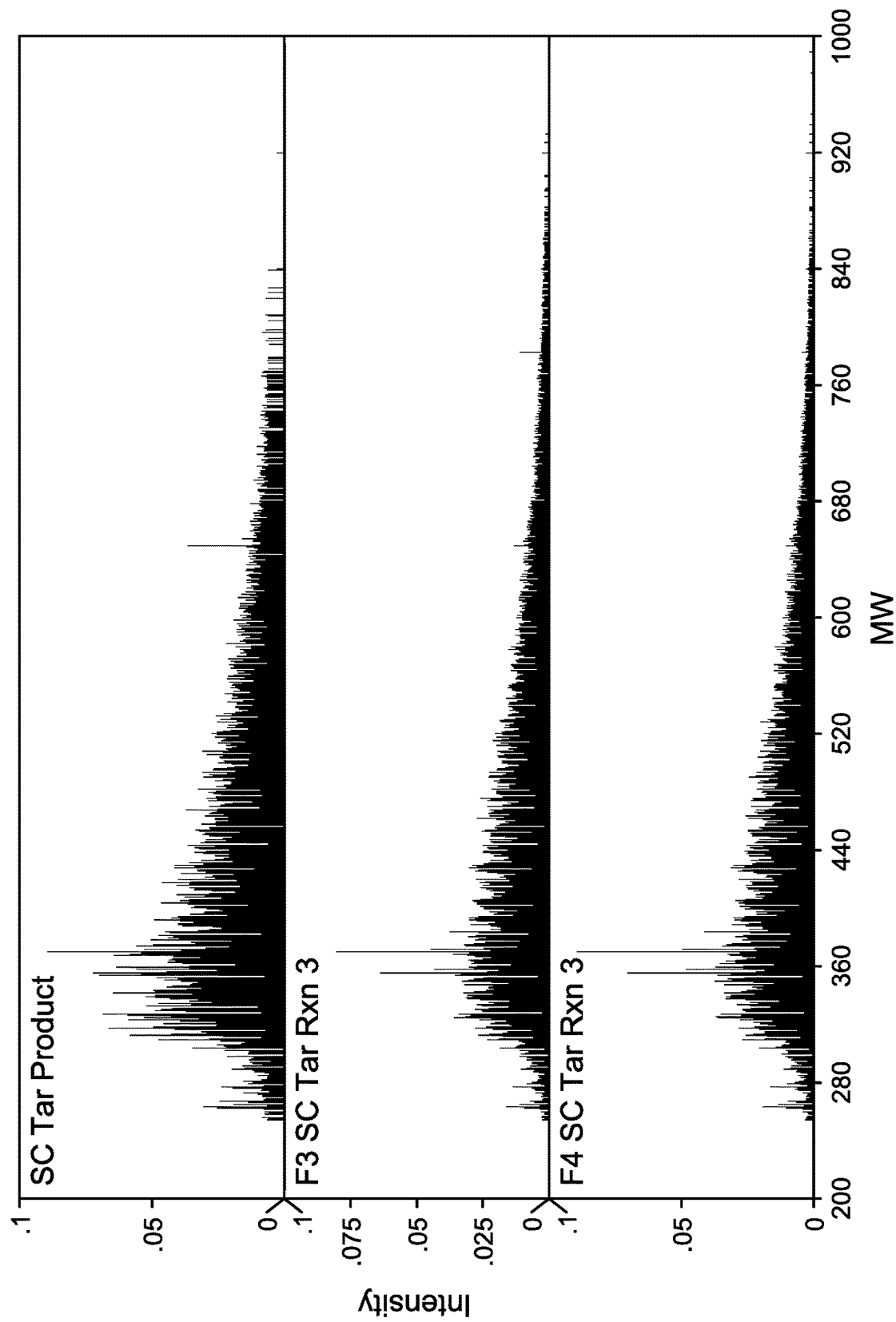
FIG. 10 illustrates the Fourier transform ion cyclotron resonance (FTICR) mass spectra of dichlorocarbene treated steam cracked tar.

FIG. 10 illustrates the FTICR mass spectra of the samples from Table 1 (product; 2 hour reaction time) and Table 2 (4 hour and 7 hour reaction times).

Figure 11:
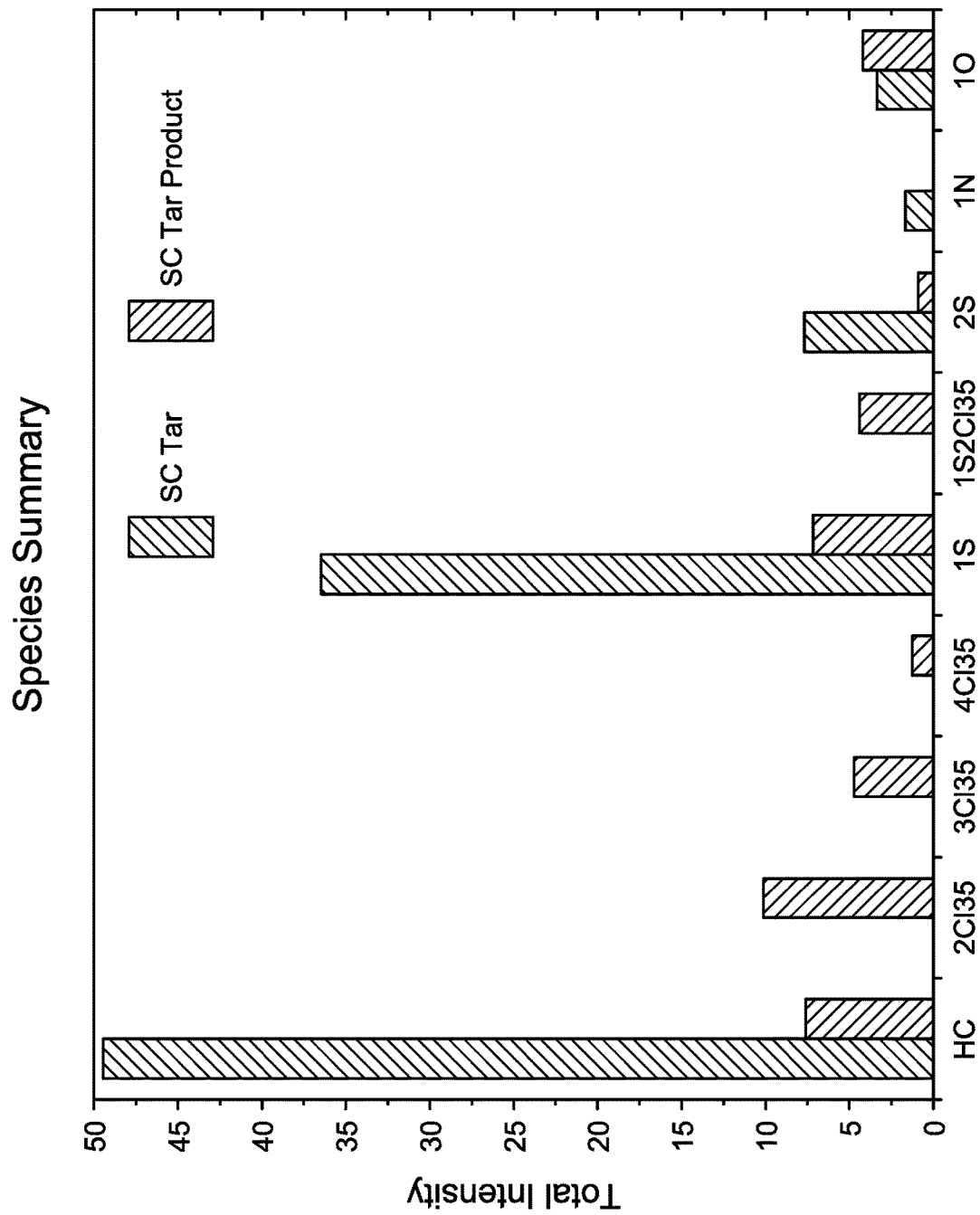
FIG. 11 illustrates the grouped chlorine heteroatom classes of dichlorocarbene treated steam cracked tar.

FIG. 11 illustrates the grouped chlorine heteroatom class distributions derived from FTICR mass spectral data for the same three samples and of the starting material. The results indicate the relative heteroatom content of each of the samples. It can be seen that compounds containing up to six chlorine atoms are present and that the relative amount of chlorine increases with increasing reaction time. Further, both chlorine containing polycyclic aromatic molecules and chlorine containing heteroaromatic molecules (containing sulfur and oxygen) are present. Molecules containing a single chlorine atom may be formed by ionization of molecules containing two chlorine atoms. The results for the starting material indicate the absence of chlorine.

Example 5

Steam cracked tar was treated with dichlorocarbene at 60-120° C. for 2 days. The product contained 13.2% chlorine by weight. The product was heated at 180° C. resulting in a 19% weight loss and a product containing 16.7% chlorine by weight.

Example 6

Kearl bitumen was treated with dichlorocarbene. The crude product and the product resulting from thorough water washing were both solids which were insoluble in organic solvent. The chlorine content was estimated to be >50% by weight for both the crude and water washed materials. Table 3 collects the results of chlorine analysis by weight and micro carbon residue.

TABLE 3

| Sample | Sample No. | MCR % | Cl % |
|---|---|---|---|
| Kearl bitumen | H | 15.2 | 0.012 |
| Crude product | I | 58 | >50 |
| Water washed product | J | 40.7 | >50 |

Example 7

The product of steam cracked tar and dichlorocarbene from Example 4 (Sample G) was molded with epoxy resin (4:1 epoxy:hardener) to yield a product containing 10% by weight of the steam cracked tar product. The mechanical properties of the steam cracked tar product-epoxy material were compared to a control of 100% epoxy resin.

Mechanical properties by Intron tensile strength tests (Table 4) showed that the 10 wt. % steam cracked tar material incorporated into the epoxy resin is as strong, less stiff, but tougher than the control under the same conditions and preparation methods. Also, the product material absorbed twice much as energy (estimated) than the control under the same strain (tensile strain at maximal load doubled).

TABLE 4

| Sample | Maximum load (lbf) | Load at Break (standard) (lbf) | Tensile Stress at Break (Standard) (lbf) | Tensile Strain at Maximum Load (%) | Tensile Stress at Yield (Zero Slope) (ksi) | Tensile Stress at Yield (Slope Threshold 0.2%) (ksi) | Modulus (E-modulus) (ksi) | Modulus (Automatic) (ksi) |
|---|---|---|---|---|---|---|---|---|
| Product | 155.83 | 149.46 | 4.39 | 3.36 | 4.58 | 4.58 | 174.34 | 174.09 |
| Control | 178.12 | 159.63 | 4.60 | 1.71 | 5.13 | 5.13 | 573.38 | 541.31 |

The data demonstrates that the mechanical properties of the epoxy resin can be improved by incorporating the carbene treated steam cracked tar product. Since the reagents used (polyaromatic feedstock, chloroform and sodium hydroxide) are low cost and the procedure (simple stirring and heating) straightforward, it is likely that the cost to scale-up would be relatively low, compared to alternative methods (plasticizers, etc.).

All patents, patent applications and other documents cited herein are fully incorporated by reference to the extent such disclosure is not inconsistent with this disclosure and for all jurisdictions in which such incorporation is permitted.

Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A process for oligomerizing or polymerizing a feedstock, comprising:
    mixing a feedstock comprising polyaromatic hydrocarbons, polyheterocyclic compounds, or a combination thereof, with chloroform and potassium t-butoxide at a temperature between about 60° C. and 100° C. for forming carbenes to form a mixture;
    exposing the mixture to conditions for forming carbenes to form a functionalized feedstock comprising functionalized polyaromatic hydrocarbons, functionalized polyheterocyclic compounds, or a combination thereof, that are functionalized by addition of two or more cyclopropane rings; and
    treating the functionalized feedstock under conditions effective to oligomerize, polymerize, or a combination thereof at least a portion of the functionalized polyaromatic hydrocarbons, functionalized polyheterocyclic compounds, or a combination thereof, to form an oligomerized product, polymerized product, or a combination thereof,
    wherein the oligomerization, polymerization, or a combination thereof is effected via cyclopropane rings added during the exposing,
    wherein the feedstock comprises vacuum residue, fluidic catalytic cracking (FCC') bottoms, steam cracker tar, asphaltenes, C3-C7 rock, bitumen, K-pot bottoms, lube extracts, or a combination thereof,
    wherein the polyaromatic hydrocarbons are hydrocarbons having at least two rings, at least one of which is aromatic, and
    wherein the polyheterocyclic compounds are compounds having at least two rings, at least one of which is aromatic, and having at least one aromatic ring that contains one or more heteroatoms selected from sulfur, nitrogen, oxygen, or a combination thereof.

2. The process of claim 1, wherein the weight average molecular weight of the polyaromatic hydrocarbons, polyheterocyclic compounds, or a combination thereof in the feedstock is 200 Daltons to 1200 Daltons.

3. The process of claim 1, wherein the weight average molecular weight of the polyaromatic hydrocarbons, polyheterocyclic compounds, or a combination thereof in the feedstock is 400 Daltons to 1200 Daltons.

4. The process of claim 1, wherein the weight average molecular weight of the polyaromatic hydrocarbons, polyheterocyclic compounds, or a combination thereof in the feedstock is 600 Daltons to 850 Daltons.

5. The process of claim 1, wherein a hydrogen to carbon atomic ratio of the feedstock is 1.2 or less.

6. The process of claim 1, wherein the full width half maximum weight average molecular weight of the polyaromatic hydrocarbons, polyheterocyclic compounds, or a combination thereof in the feedstock is between 500 Daltons and 1000 Daltons.

7. The process of claim 1, wherein the exposing is represented by equation (2):

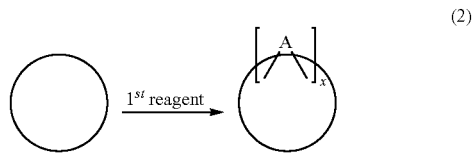

(2)

wherein the reactant circle represents, independently, one or more of the polyaromatic hydrocarbon molecules, polyheterocyclic compounds, or a combination thereof, present in the feedstock, A represents a cyclopropyl group which bridges two ring carbon atoms, two ring heteroatoms, or a ring carbon atom and a ring heteroatom, and x represents the number of cyclopropyl groups A and is an integer greater than or equal to 2.

8. The process of claim 1, wherein the treating to effect oligomerization, polymerization, or a combination thereof is represented by equation (5),

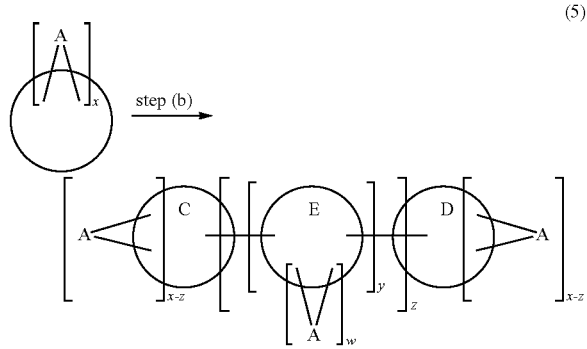

(5)

wherein the reactant circle represents at least a portion of functionalized polyaromatic hydrocarbons, functionalized polyheterocyclic compounds, or a combination thereof, the circles C, D and E represent, independently, polyaromatic hydrocarbon moieties or polyheterocyclic moieties, A represents a cyclopropyl group which bridges two ring carbon atoms, two ring heteroatoms, or a ring carbon atom and a ring heteroatom, the lines joining the circles C and D to E in the oligomerized and/or polymerized product represent a carbon-carbon bond or a carbon-heteroatom bond, x and w represent the number of functional groups, wherein x is an integer greater than or equal to 2 and w is a whole number greater than or equal to zero, and y represents the number of moieties $E(=A)_w$ which link moieties C and D, and z represents the number of links between moieties C and D, y is a whole number greater than or equal to zero and z is an integer greater than or equal to 1.

\* \* \* \* \*